United States Patent
Rule et al.

(10) Patent No.: US 12,125,021 B2
(45) Date of Patent: Oct. 22, 2024

(54) DEVICES AND METHODS FOR SELECTIVE CONTACTLESS COMMUNICATION

(71) Applicant: Capital One Services, LLC, McLean, VA (US)

(72) Inventors: Jeffrey Rule, Chevy Chase, MD (US); Kaitlin J. Newman, Washington, DC (US); Wayne David Lutz, Fort Washington, MD (US); Kevin Grant Osborn, Newton Highlands, MA (US); Paul Moreton, Glen Allen, VA (US)

(73) Assignee: CAPITAL ONE SERVICES, LLC, McLean, VA (US)

(*) Notice: Subject to any disclaimer, the term of this patent is extended or adjusted under 35 U.S.C. 154(b) by 0 days.

(21) Appl. No.: 18/407,210

(22) Filed: Jan. 8, 2024

(65) Prior Publication Data
US 2024/0144239 A1    May 2, 2024

Related U.S. Application Data

(63) Continuation of application No. 18/310,097, filed on May 1, 2023, now Pat. No. 11,868,988, which is a
(Continued)

(51) Int. Cl.
*G06Q 20/00* (2012.01)
*G06Q 20/32* (2012.01)
(Continued)

(52) U.S. Cl.
CPC ....... *G06Q 20/352* (2013.01); *G06Q 20/3226* (2013.01); *G06Q 20/353* (2013.01); *G06Q 20/3829* (2013.01); *G06Q 2220/123* (2013.01)

(58) Field of Classification Search
CPC ............ G06Q 20/352; G06Q 20/3226; G06Q 20/353; G06Q 20/3829; G06Q 2220/123; G06Q 20/24; G06Q 20/3278
(Continued)

(56) References Cited

U.S. PATENT DOCUMENTS

| 4,683,553 A | 7/1987 | Mollier |
| 4,827,113 A | 5/1989 | Rikuna |

(Continued)

FOREIGN PATENT DOCUMENTS

| CA | 2835508 A1 | 11/2012 |
| CA | 3010336 A1 | 7/2017 |

(Continued)

OTHER PUBLICATIONS

Kiernam, John S., "What is EMV?" May 29, 2012 (https://wallethub.com/edu/cc/what-is-emv/25671/).
(Continued)

*Primary Examiner* — Dante Ravetti
(74) *Attorney, Agent, or Firm* — TROUTMAN PEPPER HAMILTON SANDERS LLP; Christopher J. Forstner; John A. Morrissett

(57) ABSTRACT

A card having an antenna, one or processors, and memory having stored thereon a first application and a second application configured to receive an input of the card and determine a request associated with the input. The card is further configured to activate, responsive to determining that the request is consistent with a contactless EuroPay-MasterCard-Visa (EMV) data standard, the first application. The first application is configured to communicate, via near field communication (NFC), data to the communicating device via the antenna based on the EMV data standard for payment purposes. The card is further configured to activate, responsive to determining that the request is consistent with a near field communication data exchange format (NDEF) standard, the second application. The second application is configured to communicate, via NFC, data to the communicating device via the antenna based on the NDEF standard for verification/identification purposes.

30 Claims, 5 Drawing Sheets

Related U.S. Application Data continuation of application No. 17/960,301, filed on Oct. 5, 2022, now Pat. No. 11,682,001, which is a continuation of application No. 17/836,834, filed on Jun. 9, 2022, now Pat. No. 11,468,428, which is a continuation of application No. 16/848,063, filed on Apr. 14, 2020, now Pat. No. 11,397,941, which is a continuation of application No. 16/223,403, filed on Dec. 18, 2018, now Pat. No. 10,664,830.

(51) Int. Cl.
*G06Q 20/34* (2012.01)
*G06Q 20/38* (2012.01)

(58) Field of Classification Search
USPC ............... 705/16, 21, 59; 380/44, 262, 278
See application file for complete search history.

(56) References Cited

U.S. PATENT DOCUMENTS

| | | |
|---|---|---|
| 4,910,773 A | 3/1990 | Hazard et al. |
| 5,036,461 A | 7/1991 | Elliott et al. |
| 5,363,448 A | 11/1994 | Koopman, Jr. et al. |
| 5,377,270 A | 12/1994 | Koopman, Jr. et al. |
| 5,533,126 A | 7/1996 | Hazard |
| 5,537,314 A | 7/1996 | Kanter |
| 5,590,038 A | 12/1996 | Pitroda |
| 5,592,553 A | 1/1997 | Guski et al. |
| 5,616,901 A | 4/1997 | Crandall |
| 5,666,415 A | 9/1997 | Kaufman |
| 5,763,373 A | 6/1998 | Robinson et al. |
| 5,764,789 A | 6/1998 | Pare, Jr. et al. |
| 5,768,373 A | 6/1998 | Lohstroh et al. |
| 5,778,072 A | 7/1998 | Samar |
| 5,796,827 A | 8/1998 | Coppersmith et al. |
| 5,832,090 A | 11/1998 | Raspotnik |
| 5,883,810 A | 3/1999 | Franklin et al. |
| 5,901,874 A | 5/1999 | Deters |
| 5,929,413 A | 7/1999 | Gardner |
| 5,960,411 A | 9/1999 | Hartman et al. |
| 6,021,203 A | 2/2000 | Douceur et al. |
| 6,049,328 A | 4/2000 | Vanderheiden |
| 6,058,373 A | 5/2000 | Blinn et al. |
| 6,061,666 A | 5/2000 | Do et al. |
| 6,098,890 A | 8/2000 | Kreft et al. |
| 6,105,013 A | 8/2000 | Curry et al. |
| 6,199,114 B1 | 3/2001 | White et al. |
| 6,199,762 B1 | 3/2001 | Hohle |
| 6,216,227 B1 | 4/2001 | Goldstein et al. |
| 6,227,447 B1 | 5/2001 | Campisano |
| 6,282,522 B1 | 8/2001 | Davis et al. |
| 6,324,271 B1 | 11/2001 | Sawyer et al. |
| 6,342,844 B1 | 1/2002 | Rozin |
| 6,367,011 B1 | 4/2002 | Lee et al. |
| 6,402,028 B1 | 6/2002 | Graham, Jr. et al. |
| 6,438,550 B1 | 8/2002 | Doyle et al. |
| 6,501,847 B2 | 12/2002 | Helot et al. |
| 6,631,197 B1 | 10/2003 | Taenzer |
| 6,641,050 B2 | 11/2003 | Kelley et al. |
| 6,655,585 B2 | 12/2003 | Shinn |
| 6,662,020 B1 | 12/2003 | Aaro et al. |
| 6,721,706 B1 | 4/2004 | Strubbe et al. |
| 6,731,778 B1 | 5/2004 | Oda et al. |
| 6,779,115 B1 | 8/2004 | Naim |
| 6,792,533 B2 | 9/2004 | Jablon |
| 6,829,711 B1 | 12/2004 | Kwok et al. |
| 6,834,271 B1 | 12/2004 | Hodgson et al. |
| 6,834,795 B1 | 12/2004 | Rasmussen et al. |
| 6,852,031 B1 | 2/2005 | Rowe |
| 6,865,547 B1 | 3/2005 | Brake, Jr. et al. |
| 6,873,260 B2 | 3/2005 | Lancos et al. |
| 6,877,656 B1 | 4/2005 | Jaros et al. |
| 6,889,198 B2 | 5/2005 | Kawan |
| 6,905,411 B2 | 6/2005 | Nguyen et al. |
| 6,910,627 B1 | 6/2005 | Simpson-Young et al. |
| 6,971,031 B2 | 11/2005 | Haala |
| 6,990,588 B1 | 1/2006 | Yasukura |
| 7,006,986 B1 | 2/2006 | Sines et al. |
| 7,085,931 B1 | 8/2006 | Smith et al. |
| 7,127,605 B1 | 10/2006 | Montgomery et al. |
| 7,128,274 B2 | 10/2006 | Kelley et al. |
| 7,140,550 B2 | 11/2006 | Ramachandran |
| 7,152,045 B2 | 12/2006 | Hoffman |
| 7,165,727 B2 | 1/2007 | de Jong |
| 7,175,076 B1 | 2/2007 | Block et al. |
| 7,202,773 B1 | 4/2007 | Oba et al. |
| 7,206,806 B2 | 4/2007 | Pineau |
| 7,232,073 B1 | 6/2007 | de Jong |
| 7,246,752 B2 | 7/2007 | Brown |
| 7,252,242 B2 | 8/2007 | Ho |
| 7,254,569 B2 | 8/2007 | Goodman et al. |
| 7,263,507 B1 | 8/2007 | Brake, Jr. et al. |
| 7,270,276 B2 | 9/2007 | Vayssiere |
| 7,278,025 B2 | 10/2007 | Saito et al. |
| 7,287,692 B1 | 10/2007 | Patel et al. |
| 7,290,709 B2 | 11/2007 | Tsai et al. |
| 7,306,143 B2 | 12/2007 | Bonneau, Jr. et al. |
| 7,319,986 B2 | 1/2008 | Praisner et al. |
| 7,325,132 B2 | 1/2008 | Takayama et al. |
| 7,373,515 B2 | 5/2008 | Owen et al. |
| 7,374,099 B2 | 5/2008 | de Jong |
| 7,375,616 B2 | 5/2008 | Rowse et al. |
| 7,380,710 B2 | 6/2008 | Brown |
| 7,424,977 B2 | 9/2008 | Smets et al. |
| 7,453,439 B1 | 11/2008 | Kushler et al. |
| 7,472,829 B2 | 1/2009 | Brown |
| 7,487,357 B2 | 2/2009 | Smith et al. |
| 7,527,208 B2 | 5/2009 | Hammad |
| 7,568,631 B2 | 8/2009 | Gibbs et al. |
| 7,584,153 B2 | 9/2009 | Brown et al. |
| 7,597,250 B2 | 10/2009 | Finn |
| 7,628,322 B2 | 12/2009 | Holtmanns et al. |
| 7,652,578 B2 | 1/2010 | Braun et al. |
| 7,689,832 B2 | 3/2010 | Talmor et al. |
| 7,703,142 B1 | 4/2010 | Wilson et al. |
| 7,748,609 B2 | 7/2010 | Sachdeva et al. |
| 7,748,617 B2 | 7/2010 | Gray |
| 7,748,636 B2 | 7/2010 | Finn |
| 7,762,457 B2 | 7/2010 | Bonalle et al. |
| 7,789,302 B2 | 9/2010 | Tame |
| 7,793,851 B2 | 9/2010 | Mullen |
| 7,796,013 B2 | 9/2010 | Murakami et al. |
| 7,801,799 B1 | 9/2010 | Brake, Jr. et al. |
| 7,801,829 B2 | 9/2010 | Gray et al. |
| 7,805,755 B2 | 9/2010 | Brown et al. |
| 7,809,643 B2 | 10/2010 | Phillips et al. |
| 7,827,115 B2 | 11/2010 | Weller et al. |
| 7,828,214 B2 | 11/2010 | Narendra et al. |
| 7,848,746 B2 | 12/2010 | Juels |
| 7,882,553 B2 | 2/2011 | Tuliani |
| 7,900,048 B2 | 3/2011 | Andersson |
| 7,908,216 B1 | 3/2011 | Davis et al. |
| 7,922,082 B2 | 4/2011 | Muscato |
| 7,933,589 B1 | 4/2011 | Mamdani et al. |
| 7,949,559 B2 | 5/2011 | Freiberg |
| 7,954,716 B2 | 6/2011 | Narendra et al. |
| 7,954,723 B2 | 6/2011 | Charrat |
| 7,962,369 B2 | 6/2011 | Rosenberg |
| 7,993,197 B2 | 8/2011 | Kaminkow |
| 8,005,426 B2 | 8/2011 | Huomo et al. |
| 8,010,405 B1 | 8/2011 | Bortolin et al. |
| RE42,762 E | 9/2011 | Shin et al. |
| 8,041,954 B2 | 10/2011 | Plesman |
| 8,060,012 B2 | 11/2011 | Sklovsky et al. |
| 8,074,877 B2 | 12/2011 | Mullen et al. |
| 8,082,450 B2 | 12/2011 | Frey et al. |
| 8,095,113 B2 | 1/2012 | Kean et al. |
| 8,099,332 B2 | 1/2012 | Lemay et al. |
| 8,103,249 B2 | 1/2012 | Markison |
| 8,108,307 B1 | 1/2012 | Kawan et al. |
| 8,108,687 B2 | 1/2012 | Ellis et al. |
| 8,127,143 B2 | 2/2012 | Abdallah et al. |
| 8,135,648 B2 | 3/2012 | Oram et al. |

(56) References Cited

U.S. PATENT DOCUMENTS

| | | |
|---|---|---|
| 8,140,010 B2 | 3/2012 | Symons et al. |
| 8,141,136 B2 | 3/2012 | Lee et al. |
| 8,150,321 B2 | 4/2012 | Winter et al. |
| 8,150,767 B2 | 4/2012 | Wankmueller |
| 8,186,602 B2 | 5/2012 | Itay et al. |
| 8,196,131 B1 | 6/2012 | von Behren et al. |
| 8,215,563 B2 | 7/2012 | Levy et al. |
| 8,224,753 B2 | 7/2012 | Atef et al. |
| 8,232,879 B2 | 7/2012 | Davis |
| 8,233,841 B2 | 7/2012 | Griffin et al. |
| 8,245,292 B2 | 8/2012 | Buer |
| 8,249,654 B1 | 8/2012 | Zhu |
| 8,266,451 B2 | 9/2012 | Leydier et al. |
| 8,276,814 B1 | 10/2012 | Davis |
| 8,285,329 B1 | 10/2012 | Zhu |
| 8,302,872 B2 | 11/2012 | Mullen |
| 8,312,519 B1 | 11/2012 | Bailey et al. |
| 8,316,237 B1 | 11/2012 | Felsher et al. |
| 8,332,272 B2 | 12/2012 | Fisher |
| 8,346,670 B2 | 1/2013 | Hasson |
| 8,365,988 B1 | 2/2013 | Medina, III et al. |
| 8,369,960 B2 | 2/2013 | Tran et al. |
| 8,371,501 B1 | 2/2013 | Hopkins |
| 8,381,307 B2 | 2/2013 | Cimino |
| 8,391,719 B2 | 3/2013 | Alameh et al. |
| 8,417,231 B2 | 4/2013 | Sanding et al. |
| 8,439,271 B2 | 5/2013 | Smets et al. |
| 8,475,367 B1 | 7/2013 | Yuen et al. |
| 8,489,112 B2 | 7/2013 | Roeding et al. |
| 8,511,542 B2 | 8/2013 | Pan |
| 8,511,547 B2 | 8/2013 | Rans |
| 8,519,822 B2 | 8/2013 | Riegebauer |
| 8,559,872 B2 | 10/2013 | Butler |
| 8,566,916 B1 | 10/2013 | Bailey et al. |
| 8,567,670 B2 | 10/2013 | Stanfield et al. |
| 8,572,386 B2 | 10/2013 | Takekawa et al. |
| 8,577,810 B1 | 11/2013 | Dalit et al. |
| 8,583,454 B2 | 11/2013 | Beraja et al. |
| 8,589,335 B2 | 11/2013 | Smith et al. |
| 8,594,730 B2 | 11/2013 | Bona et al. |
| 8,615,468 B2 | 12/2013 | Varadarajan |
| 8,620,218 B2 | 12/2013 | Awad |
| 8,667,285 B2 | 3/2014 | Coulier et al. |
| 8,723,941 B1 | 5/2014 | Shirbabadi et al. |
| 8,726,405 B1 | 5/2014 | Bailey et al. |
| 8,740,073 B2 | 6/2014 | Vijayshankar et al. |
| 8,750,514 B2 | 6/2014 | Gallo et al. |
| 8,752,189 B2 | 6/2014 | de Jong |
| 8,794,509 B2 | 8/2014 | Bishop et al. |
| 8,799,668 B2 | 8/2014 | Cheng |
| 8,806,592 B2 | 8/2014 | Ganesan |
| 8,807,440 B1 | 8/2014 | Von Behren et al. |
| 8,811,892 B2 | 8/2014 | Khan et al. |
| 8,814,039 B2 | 8/2014 | Bishop et al. |
| 8,814,052 B2 | 8/2014 | Bona et al. |
| 8,818,867 B2 | 8/2014 | Baldwin et al. |
| 8,850,538 B1 | 9/2014 | Vernon et al. |
| 8,861,733 B2 | 10/2014 | Benteo et al. |
| 8,870,081 B2 | 10/2014 | Olson |
| 8,880,027 B1 | 11/2014 | Darringer |
| 8,888,002 B2 | 11/2014 | Marshall Chesney et al. |
| 8,898,088 B2 | 11/2014 | Springer et al. |
| 8,934,837 B2 | 1/2015 | Zhu et al. |
| 8,977,569 B2 | 3/2015 | Rao |
| 8,994,498 B2 | 3/2015 | Agrafioti et al. |
| 9,004,365 B2 | 4/2015 | Bona et al. |
| 9,038,893 B2 | 5/2015 | Kirkham |
| 9,038,894 B2 | 5/2015 | Khalid |
| 9,042,814 B2 | 5/2015 | Royston et al. |
| 9,047,531 B2 | 6/2015 | Showering et al. |
| 9,069,976 B2 | 6/2015 | Toole et al. |
| 9,081,948 B2 | 7/2015 | Magne |
| 9,104,853 B2 | 8/2015 | Venkataramani et al. |
| 9,118,663 B1 | 8/2015 | Bailey et al. |
| 9,122,964 B2 | 9/2015 | Krawczewicz |
| 9,129,199 B2 | 9/2015 | Spodak |
| 9,129,280 B2 | 9/2015 | Bona et al. |
| 9,152,832 B2 | 10/2015 | Royston et al. |
| 9,183,490 B2 | 11/2015 | Moreton |
| 9,203,800 B2 | 12/2015 | Izu et al. |
| 9,209,867 B2 | 12/2015 | Royston |
| 9,251,330 B2 | 2/2016 | Boivie et al. |
| 9,251,518 B2 | 2/2016 | Levin et al. |
| 9,258,715 B2 | 2/2016 | Borghei |
| 9,270,337 B2 | 2/2016 | Zhu et al. |
| 9,275,325 B2 | 3/2016 | Newcombe |
| 9,286,606 B2 | 3/2016 | Diamond |
| 9,306,626 B2 | 4/2016 | Hall et al. |
| 9,306,942 B1 | 4/2016 | Bailey et al. |
| 9,324,066 B2 | 4/2016 | Archer et al. |
| 9,324,067 B2 | 4/2016 | Van Os et al. |
| 9,332,587 B2 | 5/2016 | Salahshoor |
| 9,338,622 B2 | 5/2016 | Bjontegard |
| 9,373,141 B1 | 6/2016 | Shakkarwar |
| 9,379,841 B2 | 6/2016 | Fine et al. |
| 9,413,430 B2 | 8/2016 | Royston et al. |
| 9,413,768 B1 | 8/2016 | Gregg et al. |
| 9,420,496 B1 | 8/2016 | Indurkar |
| 9,426,132 B1 | 8/2016 | Alikhani |
| 9,432,339 B1 | 8/2016 | Bowness |
| 9,455,968 B1 | 9/2016 | Machani et al. |
| 9,473,509 B2 | 10/2016 | Arsanjani et al. |
| 9,491,626 B2 | 11/2016 | Sharma et al. |
| 9,501,776 B2 | 11/2016 | Martin |
| 9,553,637 B2 | 1/2017 | Yang et al. |
| 9,619,952 B1 | 4/2017 | Zhao et al. |
| 9,635,000 B1 | 4/2017 | Muftic |
| 9,665,858 B1 | 5/2017 | Kumar |
| 9,674,705 B2 | 6/2017 | Rose et al. |
| 9,679,286 B2 | 6/2017 | Colnot et al. |
| 9,680,942 B2 | 6/2017 | Dimmick |
| 9,710,744 B2 | 7/2017 | Wurmfeld |
| 9,710,804 B2 | 7/2017 | Zhou et al. |
| 9,740,342 B2 | 8/2017 | Paulsen et al. |
| 9,740,988 B1 | 8/2017 | Levin et al. |
| 9,763,097 B2 | 9/2017 | Robinson et al. |
| 9,767,329 B2 | 9/2017 | Forster |
| 9,769,662 B1 | 9/2017 | Queru |
| 9,773,151 B2 | 9/2017 | Mil'shtein et al. |
| 9,780,953 B2 | 10/2017 | Gaddam et al. |
| 9,891,823 B2 | 2/2018 | Feng et al. |
| 9,940,571 B1 | 4/2018 | Herrington |
| 9,949,065 B1 | 4/2018 | Zarakas |
| 9,953,323 B2 | 4/2018 | Candelore et al. |
| 9,961,194 B1 | 5/2018 | Wiechman et al. |
| 9,965,632 B2 | 5/2018 | Zarakas |
| 9,965,756 B2 | 5/2018 | Davis et al. |
| 9,965,911 B2 | 5/2018 | Wishne |
| 9,977,890 B2 | 5/2018 | Alberti |
| 9,978,056 B2 | 5/2018 | Seo |
| 9,978,058 B2 | 5/2018 | Wurmfeld et al. |
| 9,990,795 B2 | 6/2018 | Wurmfeld |
| 10,007,873 B2 | 6/2018 | Heo |
| 10,013,693 B2 | 7/2018 | Wyatt |
| 10,043,164 B2 | 8/2018 | Dogin et al. |
| 10,075,437 B1 | 9/2018 | Costigan et al. |
| 10,121,130 B2 | 11/2018 | Pinski |
| 10,129,648 B1 | 11/2018 | Hernandez et al. |
| 10,133,979 B1 | 11/2018 | Eidam et al. |
| 10,210,505 B2 | 2/2019 | Zarakas |
| 10,217,105 B1 | 2/2019 | Sangi et al. |
| 10,242,368 B1 | 3/2019 | Poole |
| 10,296,910 B1 | 5/2019 | Templeton |
| 10,332,102 B2 | 6/2019 | Zarakas |
| 10,360,557 B2 | 7/2019 | Locke |
| 10,380,471 B2 | 8/2019 | Locke |
| 10,395,244 B1 | 8/2019 | Mossler et al. |
| 10,453,054 B2 | 10/2019 | Zarakas |
| 10,474,941 B2 | 11/2019 | Wurmfeld |
| 10,475,027 B2 | 11/2019 | Guise |
| 10,482,453 B2 | 11/2019 | Zarakas |
| 10,482,457 B2 | 11/2019 | Poole |
| 10,489,774 B2 | 11/2019 | Zarakas |
| 10,510,070 B2 | 12/2019 | Wurmfeld |

(56) References Cited

U.S. PATENT DOCUMENTS

| | | |
|---|---|---|
| 10,515,361 B2 | 12/2019 | Zarakas |
| 10,535,068 B2 | 1/2020 | Locke |
| 10,546,444 B2 | 1/2020 | Osborn |
| 10,581,611 B1 | 3/2020 | Osborn et al. |
| 10,685,349 B2 | 6/2020 | Brickell |
| 10,797,882 B2 | 10/2020 | Rule |
| 10,880,741 B2 | 12/2020 | Zarakas |
| 10,970,691 B2 | 4/2021 | Koeppel |
| 11,138,593 B1 | 10/2021 | Ho |
| 11,138,605 B2 | 10/2021 | Aabye |
| 11,188,908 B2 | 11/2021 | Locke |
| 11,334,872 B2 | 5/2022 | Phillips |
| 11,461,764 B2 | 10/2022 | Rule |
| 11,481,764 B2 | 10/2022 | Shakkarwar |
| 2001/0010723 A1 | 8/2001 | Pinkas |
| 2001/0029485 A1 | 10/2001 | Brody et al. |
| 2001/0034702 A1 | 10/2001 | Mockett et al. |
| 2001/0054003 A1 | 12/2001 | Chien et al. |
| 2002/0078345 A1 | 6/2002 | Sandhu et al. |
| 2002/0093530 A1 | 7/2002 | Krothapalli et al. |
| 2002/0100808 A1 | 8/2002 | Norwood et al. |
| 2002/0120583 A1 | 8/2002 | Keresman, III et al. |
| 2002/0152116 A1 | 10/2002 | Yan et al. |
| 2002/0153424 A1 | 10/2002 | Li |
| 2002/0165827 A1 | 11/2002 | Gien et al. |
| 2003/0023554 A1 | 1/2003 | Yap et al. |
| 2003/0034873 A1 | 2/2003 | Chase et al. |
| 2003/0055727 A1 | 3/2003 | Walker et al. |
| 2003/0078882 A1 | 4/2003 | Sukeda et al. |
| 2003/0167350 A1 | 9/2003 | Davis et al. |
| 2003/0208449 A1 | 11/2003 | Diao |
| 2004/0015958 A1 | 1/2004 | Veil et al. |
| 2004/0039919 A1 | 2/2004 | Takayama et al. |
| 2004/0127256 A1 | 7/2004 | Goldthwaite et al. |
| 2004/0215674 A1 | 10/2004 | Odinak et al. |
| 2004/0230799 A1 | 11/2004 | Davis |
| 2005/0044367 A1 | 2/2005 | Gasparini et al. |
| 2005/0075985 A1 | 4/2005 | Cartmell |
| 2005/0081038 A1 | 4/2005 | Arditti Modiano et al. |
| 2005/0138387 A1 | 6/2005 | Lam et al. |
| 2005/0156026 A1 | 7/2005 | Ghosh et al. |
| 2005/0160049 A1 | 7/2005 | Lundholm |
| 2005/0195975 A1 | 9/2005 | Kawakita |
| 2005/0247797 A1 | 11/2005 | Ramachandran |
| 2006/0006230 A1 | 1/2006 | Bear et al. |
| 2006/0040726 A1 | 2/2006 | Szrek et al. |
| 2006/0041402 A1 | 2/2006 | Baker |
| 2006/0044153 A1 | 3/2006 | Dawidowsky |
| 2006/0047954 A1 | 3/2006 | Sachdeva et al. |
| 2006/0085848 A1 | 4/2006 | Aissi et al. |
| 2006/0136334 A1 | 6/2006 | Atkinson et al. |
| 2006/0173985 A1 | 8/2006 | Moore |
| 2006/0174331 A1 | 8/2006 | Schuetz |
| 2006/0242698 A1 | 10/2006 | Inskeep et al. |
| 2006/0280338 A1 | 12/2006 | Rabb |
| 2007/0033642 A1 | 2/2007 | Ganesan et al. |
| 2007/0055630 A1 | 3/2007 | Gauthier et al. |
| 2007/0061266 A1 | 3/2007 | Moore et al. |
| 2007/0061487 A1 | 3/2007 | Moore et al. |
| 2007/0116292 A1 | 5/2007 | Kurita et al. |
| 2007/0118745 A1 | 5/2007 | Buer |
| 2007/0197261 A1 | 8/2007 | Humbel |
| 2007/0224969 A1 | 9/2007 | Rao |
| 2007/0241182 A1 | 10/2007 | Buer |
| 2007/0256134 A1 | 11/2007 | Lehtonen et al. |
| 2007/0258594 A1 | 11/2007 | Sandhu et al. |
| 2007/0278291 A1 | 12/2007 | Rans et al. |
| 2008/0008315 A1 | 1/2008 | Fontana et al. |
| 2008/0011831 A1 | 1/2008 | Bonalle et al. |
| 2008/0014867 A1 | 1/2008 | Finn |
| 2008/0035738 A1 | 2/2008 | Mullen |
| 2008/0071681 A1 | 3/2008 | Khalid |
| 2008/0072303 A1 | 3/2008 | Syed |
| 2008/0086767 A1 | 4/2008 | Kulkarni et al. |
| 2008/0103968 A1 | 5/2008 | Bies et al. |
| 2008/0109309 A1 | 5/2008 | Landau et al. |
| 2008/0110983 A1 | 5/2008 | Ashfield |
| 2008/0120711 A1 | 5/2008 | Dispensa |
| 2008/0156873 A1 | 7/2008 | Wilhelm et al. |
| 2008/0162312 A1 | 7/2008 | Sklovsky et al. |
| 2008/0164308 A1 | 7/2008 | Aaron et al. |
| 2008/0207307 A1 | 8/2008 | Cunningham, II et al. |
| 2008/0209543 A1 | 8/2008 | Aaron |
| 2008/0223918 A1 | 9/2008 | Williams et al. |
| 2008/0285746 A1 | 11/2008 | Landrock et al. |
| 2008/0308641 A1 | 12/2008 | Finn |
| 2009/0037275 A1 | 2/2009 | Pollio |
| 2009/0048026 A1 | 2/2009 | French |
| 2009/0132417 A1 | 5/2009 | Scipioni et al. |
| 2009/0143104 A1 | 6/2009 | Loh et al. |
| 2009/0171682 A1 | 7/2009 | Dixon et al. |
| 2009/0210308 A1 | 8/2009 | Toomer et al. |
| 2009/0235339 A1 | 9/2009 | Mennes et al. |
| 2009/0249077 A1 | 10/2009 | Gargaro et al. |
| 2009/0282264 A1 | 11/2009 | Ameil et al. |
| 2010/0023449 A1 | 1/2010 | Skowronek et al. |
| 2010/0023455 A1 | 1/2010 | Dispensa et al. |
| 2010/0029202 A1 | 2/2010 | Jolivet et al. |
| 2010/0033310 A1 | 2/2010 | Narendra et al. |
| 2010/0036769 A1 | 2/2010 | Winters et al. |
| 2010/0078471 A1 | 4/2010 | Lin et al. |
| 2010/0082491 A1 | 4/2010 | Rosenblatt et al. |
| 2010/0094754 A1 | 4/2010 | Bertran et al. |
| 2010/0095130 A1 | 4/2010 | Bertran et al. |
| 2010/0100480 A1 | 4/2010 | Altman et al. |
| 2010/0114731 A1 | 5/2010 | Kingston et al. |
| 2010/0192230 A1 | 7/2010 | Steeves et al. |
| 2010/0207742 A1 | 8/2010 | Buhot et al. |
| 2010/0211797 A1 | 8/2010 | Westerveld et al. |
| 2010/0240413 A1 | 9/2010 | He et al. |
| 2010/0257357 A1 | 10/2010 | McClain |
| 2010/0312634 A1 | 12/2010 | Cervenka |
| 2010/0312635 A1 | 12/2010 | Cervenka |
| 2011/0028160 A1 | 2/2011 | Roeding et al. |
| 2011/0035604 A1 | 2/2011 | Habraken |
| 2011/0060631 A1 | 3/2011 | Grossman et al. |
| 2011/0068170 A1 | 3/2011 | Lehman |
| 2011/0084132 A1 | 4/2011 | Tofighbakhsh |
| 2011/0101093 A1 | 5/2011 | Ehrensvard |
| 2011/0113245 A1 | 5/2011 | Varadarajan |
| 2011/0125638 A1 | 5/2011 | Davis et al. |
| 2011/0131415 A1 | 6/2011 | Schneider |
| 2011/0153437 A1 | 6/2011 | Archer et al. |
| 2011/0153496 A1 | 6/2011 | Royyuru |
| 2011/0208658 A1 | 8/2011 | Makhotin |
| 2011/0208965 A1 | 8/2011 | Machani |
| 2011/0211219 A1 | 9/2011 | Bradley et al. |
| 2011/0218911 A1 | 9/2011 | Spodak |
| 2011/0238564 A1 | 9/2011 | Lim et al. |
| 2011/0246780 A1 | 10/2011 | Yeap et al. |
| 2011/0258452 A1 | 10/2011 | Coulier et al. |
| 2011/0280406 A1 | 11/2011 | Ma et al. |
| 2011/0282785 A1 | 11/2011 | Chin |
| 2011/0294418 A1 | 12/2011 | Chen |
| 2011/0312271 A1 | 12/2011 | Ma et al. |
| 2012/0024947 A1 | 2/2012 | Naelon |
| 2012/0030047 A1 | 2/2012 | Fuentes et al. |
| 2012/0030121 A1 | 2/2012 | Grellier |
| 2012/0047071 A1 | 2/2012 | Mullen et al. |
| 2012/0079281 A1 | 3/2012 | Lowenstein et al. |
| 2012/0109735 A1 | 5/2012 | Krawczewicz et al. |
| 2012/0109764 A1 | 5/2012 | Martin et al. |
| 2012/0143703 A1 | 6/2012 | Wall |
| 2012/0143754 A1 | 6/2012 | Patel |
| 2012/0150737 A1 | 6/2012 | Rottink et al. |
| 2012/0178366 A1 | 7/2012 | Levy et al. |
| 2012/0196583 A1 | 8/2012 | Kindo |
| 2012/0207305 A1 | 8/2012 | Gallo et al. |
| 2012/0209773 A1 | 8/2012 | Ranganathan |
| 2012/0238206 A1 | 9/2012 | Singh et al. |
| 2012/0239560 A1 | 9/2012 | Pourfallah et al. |
| 2012/0252350 A1 | 10/2012 | Steinmetz et al. |
| 2012/0254394 A1 | 10/2012 | Barras |
| 2012/0284194 A1 | 11/2012 | Liu et al. |

(56) References Cited

U.S. PATENT DOCUMENTS

| | | |
|---|---|---|
| 2012/0290472 A1 | 11/2012 | Mullen et al. |
| 2012/0296818 A1 | 11/2012 | Nuzzi et al. |
| 2012/0316992 A1 | 12/2012 | Oborne |
| 2012/0317035 A1 | 12/2012 | Royyuru et al. |
| 2012/0317628 A1 | 12/2012 | Yeager |
| 2013/0005245 A1 | 1/2013 | Royston |
| 2013/0008956 A1 | 1/2013 | Ashfield |
| 2013/0026229 A1 | 1/2013 | Jarman et al. |
| 2013/0048713 A1 | 2/2013 | Pan |
| 2013/0054474 A1 | 2/2013 | Yeager |
| 2013/0065564 A1 | 3/2013 | Conner et al. |
| 2013/0080228 A1 | 3/2013 | Fisher |
| 2013/0080229 A1 | 3/2013 | Fisher |
| 2013/0099587 A1 | 4/2013 | Lou et al. |
| 2013/0104251 A1 | 4/2013 | Moore et al. |
| 2013/0106576 A1 | 5/2013 | Hinman et al. |
| 2013/0119130 A1 | 5/2013 | Braams |
| 2013/0130614 A1 | 5/2013 | Busch-Sorensen |
| 2013/0144793 A1 | 6/2013 | Royston |
| 2013/0171929 A1 | 7/2013 | Adams et al. |
| 2013/0179351 A1 | 7/2013 | Wallner |
| 2013/0185772 A1 | 7/2013 | Jaudon et al. |
| 2013/0191279 A1 | 7/2013 | Calman et al. |
| 2013/0200999 A1 | 8/2013 | Spodak et al. |
| 2013/0211937 A1 | 8/2013 | Elbirt |
| 2013/0216108 A1 | 8/2013 | Hwang et al. |
| 2013/0226791 A1 | 8/2013 | Springer et al. |
| 2013/0226796 A1 | 8/2013 | Jiang et al. |
| 2013/0232082 A1 | 9/2013 | Krawczewicz et al. |
| 2013/0238894 A1 | 9/2013 | Ferg et al. |
| 2013/0282360 A1 | 10/2013 | Shimota et al. |
| 2013/0303085 A1 | 11/2013 | Boucher et al. |
| 2013/0304651 A1 | 11/2013 | Smith |
| 2013/0312082 A1 | 11/2013 | Izu et al. |
| 2013/0314593 A1 | 11/2013 | Reznik et al. |
| 2013/0344857 A1 | 12/2013 | Berionne et al. |
| 2014/0002238 A1 | 1/2014 | Taveau et al. |
| 2014/0019352 A1 | 1/2014 | Shrivastava |
| 2014/0027506 A1 | 1/2014 | Heo et al. |
| 2014/0032409 A1 | 1/2014 | Rosano |
| 2014/0032410 A1 | 1/2014 | Georgiev et al. |
| 2014/0040120 A1 | 2/2014 | Cho et al. |
| 2014/0040139 A1 | 2/2014 | Brudnicki et al. |
| 2014/0040147 A1 | 2/2014 | Varadarakan et al. |
| 2014/0047235 A1 | 2/2014 | Lessiak et al. |
| 2014/0067690 A1 | 3/2014 | Pitroda et al. |
| 2014/0074637 A1 | 3/2014 | Hammad |
| 2014/0074655 A1 | 3/2014 | Lim et al. |
| 2014/0081720 A1 | 3/2014 | Wu |
| 2014/0081785 A1 | 3/2014 | Valadas Preto |
| 2014/0138435 A1 | 5/2014 | Khalid |
| 2014/0171034 A1 | 6/2014 | Aleksin et al. |
| 2014/0171039 A1 | 6/2014 | Bjontegard |
| 2014/0172700 A1 | 6/2014 | Teuwen et al. |
| 2014/0180851 A1 | 6/2014 | Fisher |
| 2014/0208112 A1 | 7/2014 | McDonald et al. |
| 2014/0214674 A1 | 7/2014 | Narula |
| 2014/0229375 A1 | 8/2014 | Zaytzsev et al. |
| 2014/0245391 A1 | 8/2014 | Adenuga |
| 2014/0256251 A1 | 9/2014 | Caceres et al. |
| 2014/0258099 A1 | 9/2014 | Rosano |
| 2014/0258113 A1 | 9/2014 | Gauthier et al. |
| 2014/0258125 A1 | 9/2014 | Gerber et al. |
| 2014/0274179 A1 | 9/2014 | Zhu et al. |
| 2014/0279479 A1 | 9/2014 | Maniar et al. |
| 2014/0337235 A1 | 11/2014 | Van Heerden et al. |
| 2014/0339315 A1 | 11/2014 | Ko |
| 2014/0346860 A1 | 11/2014 | Aubry et al. |
| 2014/0365780 A1 | 12/2014 | Movassaghi |
| 2014/0379361 A1 | 12/2014 | Mahadkar et al. |
| 2015/0012444 A1 | 1/2015 | Brown et al. |
| 2015/0032635 A1 | 1/2015 | Guise |
| 2015/0071486 A1 | 3/2015 | Rhoads et al. |
| 2015/0088757 A1 | 3/2015 | Zhou et al. |
| 2015/0089586 A1 | 3/2015 | Ballesteros |
| 2015/0134452 A1 | 5/2015 | Williams |
| 2015/0140960 A1 | 5/2015 | Powell et al. |
| 2015/0154595 A1 | 6/2015 | Collinge et al. |
| 2015/0170138 A1 | 6/2015 | Rao |
| 2015/0178724 A1 | 6/2015 | Ngo et al. |
| 2015/0186871 A1 | 7/2015 | Laracey |
| 2015/0199673 A1 | 7/2015 | Savolainen |
| 2015/0205379 A1 | 7/2015 | Mag et al. |
| 2015/0302409 A1 | 10/2015 | Malek et al. |
| 2015/0317626 A1 | 11/2015 | Ran et al. |
| 2015/0332266 A1 | 11/2015 | Friedlander et al. |
| 2015/0339474 A1 | 11/2015 | Paz et al. |
| 2015/0371234 A1 | 12/2015 | Huang et al. |
| 2016/0012465 A1 | 1/2016 | Sharp |
| 2016/0021230 A1 | 1/2016 | Watanabe |
| 2016/0026997 A1 | 1/2016 | Tsui et al. |
| 2016/0048913 A1 | 2/2016 | Rausaria et al. |
| 2016/0055480 A1 | 2/2016 | Shah |
| 2016/0057619 A1 | 2/2016 | Lopez |
| 2016/0065370 A1 | 3/2016 | Le Saint et al. |
| 2016/0078430 A1 | 3/2016 | Douglas |
| 2016/0087957 A1 | 3/2016 | Shah et al. |
| 2016/0092696 A1 | 3/2016 | Guglani et al. |
| 2016/0125370 A1* | 5/2016 | Grassadonia .......... G06Q 20/16 705/39 |
| 2016/0148193 A1 | 5/2016 | Kelley et al. |
| 2016/0189143 A1 | 6/2016 | Koeppel |
| 2016/0232523 A1 | 8/2016 | Venot et al. |
| 2016/0239672 A1 | 8/2016 | Khan et al. |
| 2016/0253651 A1 | 9/2016 | Park et al. |
| 2016/0255072 A1 | 9/2016 | Liu |
| 2016/0267486 A1 | 9/2016 | Mitra et al. |
| 2016/0277383 A1 | 9/2016 | Guyomarc'H et al. |
| 2016/0307187 A1 | 10/2016 | Guo et al. |
| 2016/0307189 A1 | 10/2016 | Zarakas et al. |
| 2016/0314472 A1 | 10/2016 | Ashfield |
| 2016/0330027 A1 | 11/2016 | Ebrahimi |
| 2016/0335531 A1 | 11/2016 | Mullen et al. |
| 2016/0379217 A1 | 12/2016 | Hammad |
| 2017/0004502 A1 | 1/2017 | Quentin et al. |
| 2017/0011395 A1 | 1/2017 | Pillai et al. |
| 2017/0011406 A1 | 1/2017 | Tunnell et al. |
| 2017/0017957 A1 | 1/2017 | Radu |
| 2017/0017964 A1 | 1/2017 | Janefalkar et al. |
| 2017/0024716 A1 | 1/2017 | Jiam et al. |
| 2017/0039566 A1 | 2/2017 | Schipperheijn |
| 2017/0041759 A1 | 2/2017 | Gantert et al. |
| 2017/0068950 A1 | 3/2017 | Kwon |
| 2017/0103388 A1 | 4/2017 | Pillai et al. |
| 2017/0104739 A1 | 4/2017 | Lansler et al. |
| 2017/0109509 A1 | 4/2017 | Baghdasaryan |
| 2017/0109730 A1 | 4/2017 | Locke et al. |
| 2017/0116447 A1 | 4/2017 | Cimino et al. |
| 2017/0124568 A1 | 5/2017 | Moghadam |
| 2017/0140379 A1 | 5/2017 | Deck |
| 2017/0154328 A1 | 6/2017 | Zarakas et al. |
| 2017/0154333 A1 | 6/2017 | Gleeson et al. |
| 2017/0161978 A1 | 6/2017 | Wishne |
| 2017/0180134 A1 | 6/2017 | King |
| 2017/0230189 A1 | 8/2017 | Toll et al. |
| 2017/0237301 A1 | 8/2017 | Elad et al. |
| 2017/0289127 A1 | 10/2017 | Hendrick |
| 2017/0295013 A1 | 10/2017 | Claes |
| 2017/0316696 A1 | 11/2017 | Bartel |
| 2017/0317834 A1 | 11/2017 | Smith et al. |
| 2017/0330173 A1 | 11/2017 | Woo et al. |
| 2017/0374070 A1 | 12/2017 | Shah et al. |
| 2018/0034507 A1 | 2/2018 | Wobak et al. |
| 2018/0039986 A1 | 2/2018 | Essebag et al. |
| 2018/0039987 A1 | 2/2018 | Molino |
| 2018/0068316 A1 | 3/2018 | Essebag et al. |
| 2018/0129945 A1 | 5/2018 | Saxena et al. |
| 2018/0160255 A1 | 6/2018 | Park |
| 2018/0189527 A1 | 7/2018 | Kim |
| 2018/0191501 A1 | 7/2018 | Lindemann |
| 2018/0205712 A1 | 7/2018 | Versteeg et al. |
| 2018/0240106 A1 | 8/2018 | Garrett et al. |
| 2018/0254909 A1 | 9/2018 | Hancock |
| 2018/0268132 A1 | 9/2018 | Buer et al. |

(56) References Cited

U.S. PATENT DOCUMENTS

| | | | |
|---|---|---|---|
| 2018/0270214 A1 | 9/2018 | Caterino et al. |
| 2018/0294959 A1 | 10/2018 | Traynor et al. |
| 2018/0300716 A1 | 10/2018 | Carlson |
| 2018/0302396 A1 | 10/2018 | Camenisch et al. |
| 2018/0315050 A1 | 11/2018 | Hammad |
| 2018/0316666 A1 | 11/2018 | Koved et al. |
| 2018/0322486 A1 | 11/2018 | Deliwala et al. |
| 2018/0359100 A1 | 12/2018 | Gaddam et al. |
| 2019/0014107 A1 | 1/2019 | George |
| 2019/0019375 A1 | 1/2019 | Foley |
| 2019/0036678 A1 | 1/2019 | Ahmed |
| 2019/0172055 A1 | 6/2019 | Hale |
| 2019/0238517 A1 | 8/2019 | D'Agostino et al. |
| 2019/0303945 A1 | 10/2019 | Mitra |

FOREIGN PATENT DOCUMENTS

| | | |
|---|---|---|
| CN | 101192295 A | 6/2008 |
| CN | 103023643 A | 4/2013 |
| CN | 103417202 A | 12/2013 |
| EP | 1085424 A1 | 3/2001 |
| EP | 1223565 A1 | 7/2002 |
| EP | 1265186 A2 | 12/2002 |
| EP | 1469419 A1 | 10/2004 |
| EP | 1783919 A1 | 5/2007 |
| EP | 2139196 A1 | 12/2009 |
| EP | 2852070 A1 | 3/2015 |
| GB | 2457221 A | 8/2009 |
| GB | 2516861 A | 2/2015 |
| GB | 2551907 A | 1/2018 |
| KR | 101508320 B1 | 4/2015 |
| KR | 2015140132 A | 12/2015 |
| WO | 0049586 A1 | 8/2000 |
| WO | 2006070189 A2 | 7/2006 |
| WO | 2008055170 A2 | 5/2008 |
| WO | 2009025605 A2 | 2/2009 |
| WO | 2010049252 A1 | 5/2010 |
| WO | 2011112158 A1 | 9/2011 |
| WO | 2012001624 A1 | 1/2012 |
| WO | 2013039395 A1 | 3/2013 |
| WO | 2013155562 A1 | 10/2013 |
| WO | 2013192358 A2 | 12/2013 |
| WO | 2014043278 A1 | 3/2014 |
| WO | 2014170741 A2 | 10/2014 |
| WO | 2015179649 A1 | 11/2015 |
| WO | 2015183818 A1 | 12/2015 |
| WO | 2016097718 A1 | 6/2016 |
| WO | 2016160816 A1 | 10/2016 |
| WO | 2016168394 A1 | 10/2016 |
| WO | 2017042375 A1 | 3/2017 |
| WO | 2017042400 A1 | 3/2017 |
| WO | 2017047855 A1 | 3/2017 |
| WO | 2017157859 A1 | 9/2017 |
| WO | 2017208063 A1 | 12/2017 |
| WO | 2018063809 A1 | 4/2018 |
| WO | 2018137888 A1 | 8/2018 |
| WO | 2019022585 A1 | 1/2019 |

OTHER PUBLICATIONS

Batina, L. and Poll, E., "SmartCards and RFID", Course PowerPoint Presentation for IPA Security Course, Digital Security at University of Nijmegen, Netherlands (date unknown) 75 pages.

Haykin, M. and Warnar, R., "Smart Card Technology: New Methods for Computer Access Control", Computer Science and Technology NIST Special Publication 500-157:1-60 (1988).

Lehpamer, H., "Component of the RFID System", RFID Design Principles, 2nd edition pp. 133-201 (2012).

Author Unknown, "CardrefresherSM from American Express®", [online] 2019 [retrieved on Mar. 25, 2019]. Retrieved from Internet URL: https://merchant-channel.americanexpress.com/merchant/en_US/cardrefresher, 2 pages.

Author Unknown, "Add Account Updater to your recurring payment tool", [online] 2018-19 [retrieved on Mar. 25, 2019]. Retrieved from Internet URL: https://www.authorize.net/our-features/account-updater/, 5 pages.

Author Unknown, "Visa® Account Updater for Merchants", [online] 2019 [retrieved on Mar. 25, 2019]. Retrieved from Internet URL: https://usa.visa.com/dam/VCOM/download/merchants/visa-account-updater-product-information-fact-sheet-for-merchants.pdf, 2 pages.

Author Unknown, "Manage the cards that you use with Apple Pay", Apple Support [online] 2019 [retrieved on Mar. 25, 2019]. Retrieved from Internet URL: https://support.apple.com/en-us/HT205583, 5 pages.

Author Unknown, "Contactless Specifications for Payment Systems", EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.

Author Unknown, "EMV Integrated Circuit Card Specifcations for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.

Author Unknown, "NFC Guide: All You Need to Know About Near Field Communication", Square Guide [online] 2018 [retrieved on Nov. 13, 2018]. Retrieved from Internet URL: https://squareup.com/guides/nfc, 8 pages.

Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-payments/, 6 pages.

Cozma, N., "Copy data from other devices in Android 5.0 Lollipop setup", CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.

Kevin, Android Enthusiast, "How to copy text string from nfc tag", StackExchange [online] 2013 [retrieved on Mar. 25, 2019]. Retrieved from the Internet URL: https://android.stackexchange.com/questions/55689/how-to-copy-text-string-from-nfc-tag, 11 pages.

Author Unknown, "Tap & Go Device Setup", Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.

Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.

Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.

Song, et al., "The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.

Katz, J. and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.

Adams, D., and Maier, A-K., "Goldbug Big Seven open source crypto-messengers to be compared - or: Comprehensive Confidentiality Review & Audit of GoldBug Encrypting E-Mail-Client & Secure Instant Messenger", Big Seven Study 2016 [online] [retrieved on Mar. 25, 2018]. Retrieved from Internet URL: https://sf.net/projects/goldbug/files/bigseven-crypto-audit.pdf, 309 pages.

Author Unknown, "Triple DES", Wikipedia [online] 2018 [retrieved on Mar. 25, 2019]. Retrieved from Internet URL: https://simple.wikipedia.org/wiki/Triple_DES, 2 pages.

Song F., and Yun, A.I., "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.

(56) References Cited

OTHER PUBLICATIONS

Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.
Berg, G., "Fundamentals of EMV", Smart Card Alliance [online] date unknown [retrieved on Mar. 27, 2019]. Retrieveed from Internet URL: https://www.securetechalliance.org/resources/media/scap13_preconference/02.pdf, 37 pages.
Pierce, K., "Is the amazon echo nfc compatible?", Amazon.com Customer Q&A [online] 2016 [retrieved on Mar. 26, 2019]. Retrieved from Internet URL: https://www.amazon.com/ask/questions/Tx1RJXYSPE6XLJD?_ encodi . . . , 2 pages.
Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.
Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.
Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.
Author Unknown, "Autofill", Computer Hope [online] 2018 [retrieved on Mar. 25, 2019]. Retrieved from Internet URL: https://www.computerhope.com/jargon/a/autofill.htm, 2 pages.
Author Unknown, "Fill out forms automatically", Google Chrome Help [online] 2019 [retrieved on Mar. 25, 2019]. Retrieved from Internet URL: https://support.google.com/chrome/answer/142893?co=GENIE.Platform%3DDesktop&hl=en, 3 pages.
Author Unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.
Menghin, M.J., "Power Optimization Techniques for Near Field Communication Systems", 2014 Dissertation at Technical University of Graz [online]. Retrieved from Internet URL: https://diglib.tugraz.at/download.php?id=576a7b910d2d6&location=browse, 135 pages.
Mareli, M., et al., "Experimental evaluation of NFC reliability between an RFID tag and a smartphone", Conference paper (2013) IEEE AFRICON at Mauritius [online] [retrieved on Mar. 25, 2019]. Retrieved from Internet URL: https://core.ac.uk/download/pdf/54204839.pdf, 5 pages.
Davison, A., et al., "MonoSLAM: Real-Time Single Camera SLAM", IEEE Transactions on Pattern Analysis and Machine Intelligence 29(6): 1052-1067 (2007).
Barba, R., "Sharing your location with your bank sounds creepy, but it's also useful", Bankrate, LLC [online] 2017 [retrieved on Mar. 25, 2019]. Retrieved from Internet URL: https://www.bankrate.com/banking/banking-app-location-sharing/, 6 pages.
Author Unknown: "onetappayment™", [online] Jan. 24, 2019, [retrieved on Mar. 25, 2019]. Retrieved from Internet URL: https://www.payubiz.in/onetap, 4 pages.
Vu, et al., "Distinguishing users with capacitive touch communication", Proceedings of the Annual International Conference on Mobile Computing and Networking, 2012, MOBICOM. 10.1145/2348543.2348569.
Pourghomi, P., et al., "A Proposed NFC Payment Application," International Journal of Advanced Computer Science and Applications, 4(8):173-181 (2013).
Author unknown, "EMV Card Personalization Specification", EMVCo., LLC., specification version 1.0, (2003) 81 pages.
Ullmann et al., "On-Card" User Authentication for Contactless Smart Cards based on Gesture Recognition, paper presentation LNI proceedings, (2012) 12 pages.
Faraj, S.T., et al., "Investigation of Java Smart Card Technology for Multi-Task Applications", J of Al-Anbar University for Pure Science, 2(1):23 pages (2008).
Dhamdhere, P., "Key Benefits of a Unified Platform for Loyalty, Referral Marketing, and UGC" Annex Cloud [online]May 19, 2017 [retrieved on Jul. 3, 2019]. Retrieved from Internet URL: https://www.annexcloude.com/blog/benefits-unified-platform/, 13 pages.
Smart Card Alliance, "Co-Branded Multi-Application Contactless Cards for Transit and Financial Payment," A Smart Card Alliance Transportation Council White Paper (40 pages), Mar. 2008.

\* cited by examiner

DEVICES AND METHODS FOR SELECTIVE CONTACTLESS COMMUNICATION

CROSS-REFERENCE TO RELATED APPLICATIONS

This application is a continuation of, and claims priority under 35 U.S.C. § 120 to, U.S. patent application Ser. No. 18/310,097, filed May 1, 2023, which is a continuation of U.S. patent application Ser. No. 17/960,301, now U.S. Pat. No. 11,682,001, filed Oct. 5, 2022, which is a continuation of U.S. patent application Ser. No. 17/836,834, now U.S. Pat. No. 11,468,428, filed Jun. 9, 2022, which is a continuation of U.S. patent application Ser. No. 16/848,063, now U.S. Pat. No. 11,397,941, filed Apr. 14, 2020, which is a continuation of U.S. patent application Ser. No. 16/223,403, now U.S. Pat. No. 10,664,830, filed on Dec. 18, 2018, the entire contents of each of which are fully incorporated herein by reference.

FIELD

The presently disclosed subject matter relates generally to contactless communication devices configured to communicate with other devices and, more particularly, to contactless cards configured to selectively communicate different types of data and/or using different protocols to different types of other devices.

BACKGROUND

Contactless cards may be used for many purposes including for payment, access, or identification. For example, some types of contactless cards, including contactless credit cards, are configured to communicate with a payment terminal to transmit payment data when purchasing an item or making a payment. It may be advantageous to configure such payment contactless cards, including contactless credit cards, to also enable communication of identification data (or perform other authentication functions) with a mobile device or another computing device distinct from a payment transaction with a payment terminal, such as when a user is logging into an application on the mobile device to access a secured feature or payment function. Care should be taken, however, to distinguish between the different uses or functions of the contactless card and to limit the communications to only the data required for each use or function between the contactless card and the device.

Accordingly, the present disclosure is directed to embodiments of contactless cards, devices, and related methods configured to provide selective communications for improving data security of the communications when capable of communicating with different devices and/or for different functions.

SUMMARY

Aspects of the disclosed technology include devices and methods for a card capable of selective communications with a plurality of device types. Consistent with the disclosed embodiments, certain methods may utilize one or more communicating devices (e.g., mobile device, point-of-sale terminal device) and one or more contactless devices (e.g., radio frequency identification (RFID) cards). A method may include a first connection established between a card and a first device. After a data format of the first connection is determined to be a first data format, a first application of the card transmits payment data. The method may further include a second connection established between the card and a second device. After a data format of the second connection is determined to be a second data format, a second application of the card transmits identification data.

In some embodiments, the first device is a point-of-sale device and the first data format corresponds to a EuroPay-MasterCard-Visa (EMV) data standard. According to some embodiments, the second device is a mobile device, and the second data format corresponds to a near field communication data exchange format (NDEF) data standard. In the disclosed embodiments, the method may further include the card communicating with the mobile device and/or the point-of-sale device by using near field communication (NFC). The card may have a radio frequency identification (RFID) chip. Communication between the card and the device may occur when the RFID chip of the card is within an NFC range of a digital reader. The card may receive, from the mobile device, one or more instructions to generate a digital signature. In response, the card may generate the digital signature. The digital signature may be generated using a private key of a key pair or other secret. The card may transmit the digital signature to the mobile device.

In some embodiments, a card may have an antenna, one or more processors, and a memory storing instructions along with a first application and a second application. The card may receive and/or transfer data to a communicating device. Optionally, the card may include a sensor configured to detect, in cooperation with the antenna, an input of the card from a communicating device. Regardless of how the card input of the card is received, the card may be configured to determine a format (e.g., a data format) of the input in response to detecting the input of the card. In some embodiments, a data format may be determined from the input itself, in other embodiments, a data format may be determined based on an identifier associated with the first or second application, or any other indicia from which the data format may be determined. In response to determining the data format is a EuroPay-MasterCard-Visa (EMV) data standard, the card may be configured to activate the first application. The first application may be configured to communicate, via NFC, payment data to the communicating device via the antenna based on the EMV data standard. In response to determining the data format is a NDEF data standard, the processor may activate the second application. The second application may be configured to communicate, via NFC, identification data to the communicating device via the antenna based on the NDEF standard. The card may be a contactless payment card, contactless identification card, or any device capable of transmitting data through an NFC standard and/or an EMV standard. The card may be configured to send only one of the payment data and the identification data to a single communicating device. The first application may be unable to access the identification data and the second application may be unable to access the payment data.

In some embodiments, the card may further include a radio frequency identification (RFID) chip. In those embodiments, the communicating device may be a mobile device. The second application may be configured to communicate with the mobile device using the NFC standard when the RFID chip is within an NFC range of a digital reader associated with the mobile device. The second application may also transmit a public key of a key pair of the card to the mobile device and receive, from the mobile device, one or more instructions to generate a digital signature. The second application may further generate the digital signature using a private key of the key pair of the card and transmit the digital signature to the mobile device.

In further embodiments, a card may have an antenna, a radio frequency identification (RFID) chip, one or more processors, and a memory having a first application and a second application. The sensor may be configured to detect an input of the card via the antenna. The first application may be configured to communicate with a first device based on a first format of the input. The second application may be configured to communicate with a second device based on a second format of the input. The card may be configured to prevent communication between the first application and the second application. The card may be a contactless payment, contactless identification card, or any device capable of transmitting data through an NDEF data standard and/or an EMV data standard. The first format may be a EuroPay-MasterCard-Visa (EMV) data standard. The card may be configured to communicate, by the first application and through the EMV data standard, with the first device, which may be a point-of-sale device. The card may be further configured to transmit payment data, by the first application, and to the point-of-sale device. The second format may be a NDEF data standard. The card may be configured to communicate, by the second application and through the NDEF data standard, with the second device, which may be a mobile device. The card may be further configured to transmit identification data, by the second application, and to the mobile device.

In some embodiments, the second application may be further configured to communicate with the mobile device using the NDEF data standard when the RFID chip is within an NFC range of a digital reader associated with the mobile device. The second application may also transmit a public key of a key pair of the card to the mobile device and receive, from the mobile device, one or more instructions to generate a digital signature. The second application may generate the digital signature using a private key of the key pair of the card and transmit the digital signature to the mobile device.

In an exemplary use case, a cardholder may seek to make a payment with his credit card (e.g., contactless payment card). The cardholder may present the card at a merchant where the card is tapped against a point-of-sale device. The card may determine the device type as being a point-of-sale device. Accordingly, the card may transmit, from an application according to a communication protocol associated with the point-of-sale device, only the payment data to the point-of-sale device. When the payment data is received by the point-of-sale device, the data is used to make a transaction authorization decision. In this instance, the payment is approved, and the cardholder is able to complete his purchase.

Further features of the disclosed design, and the advantages offered thereby, are explained in greater detail hereinafter with reference to specific example embodiments illustrated in the accompanying drawings, wherein like elements are indicated be like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings.

DETAILED DESCRIPTION

Some implementations of the disclosed technology will be described more fully with reference to the accompanying drawings. The disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified.

Reference will now be made in detail to exemplary embodiments of the disclosed technology, examples of which are illustrated in the accompanying drawings and disclosed herein. Wherever convenient, the same reference numbers will be used throughout the drawings to refer to the same or like parts.

Figure 1A:
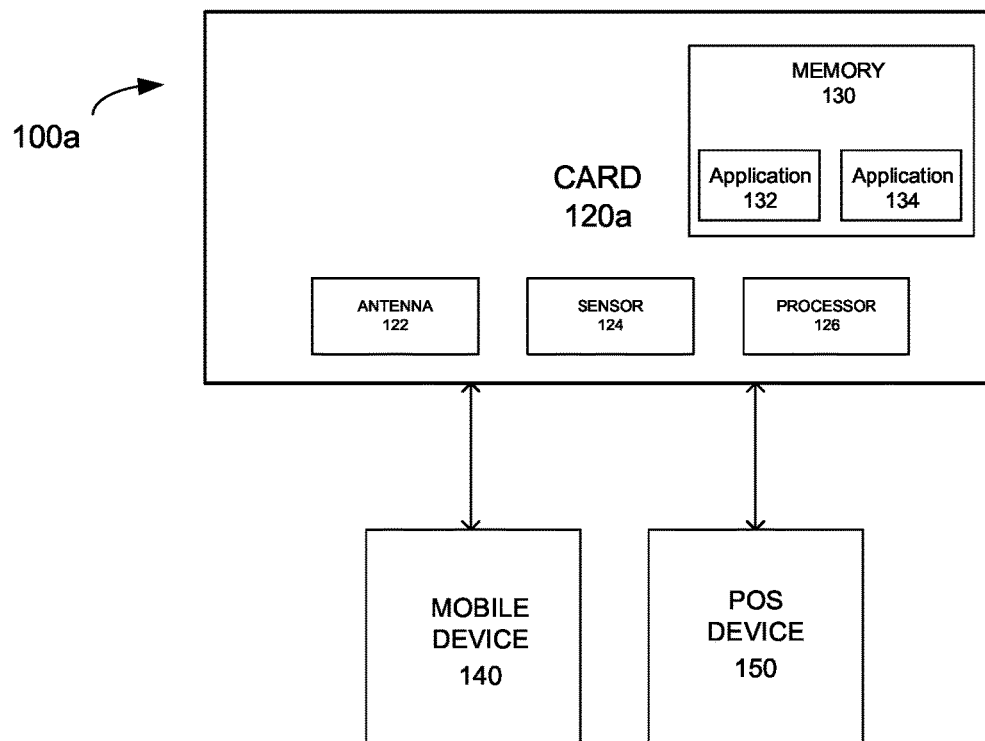
FIGS. 1A-B are diagrams of an example environment that may be used to implement one or more embodiments of the present disclosure.
Figure 1B:
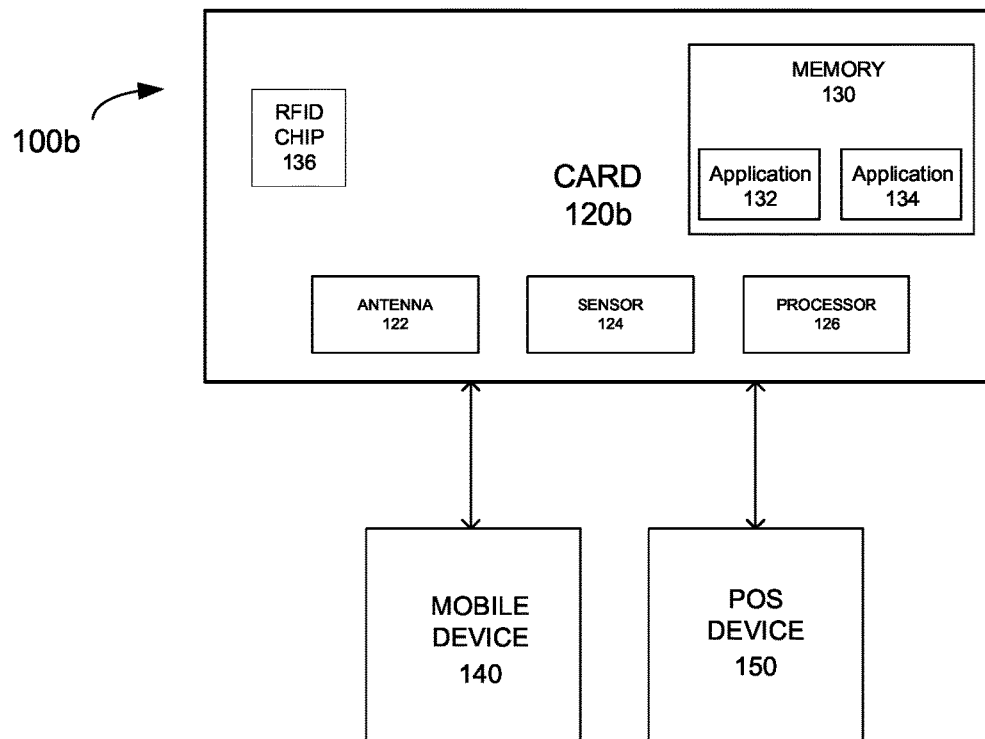

FIGS. 1A-B show an example environment 100a and 100b, respectively, that may implement certain aspects of the present disclosure. The components and arrangements shown in FIGS. 1A-B are not intended to limit the disclosed embodiments as the components used to implement the disclosed processes and features may vary. As shown in FIGS. 1A-B, in some embodiments, the environment 100a-b includes a mobile device 140, a point-of-sale device 150, and a card 120 which includes an antenna 122, a sensor 124, one or more processors 126 and a memory 130 having thereon a first application 132 and a second application 134. In some embodiments, card 120b may include a radio frequency identification (RFID) chip 136. As non-limiting examples, the mobile device 140 may be a smartphone, a laptop computer, a tablet, or other personal computing device. The mobile device 140 may run and display one or more applications and the related output(s) of the one or more applications (e.g., through APIs). The mobile device 140 may include a card reader or one or more components that may function to read from and/or communicate with a card (e.g., a digital card reader). In conjunction with the one or more applications, the card reader communicates with the one or more cards 120b (e.g., RFID cards). An example computer architecture that may be used to implement one or more of the mobile device 140 and the point-of-sale device 150 is described below with reference to FIG. 5.

In certain embodiments, the cards 120a and 120b may be configured to receive an input from a communicating device (e.g., mobile device 140, point-of-sale device 150). The input may include a request for data from the card 120a-b. The input may include a request to establish communication with the card 120a-b. The sensor 124 may detect the input, e.g., by detecting specific input sequences. In detecting the input, the sensor 124 may receive the input via the antenna 122. For example, in some embodiments, an application executing on mobile device 140 may communicate with a card 120 after a card reader of the mobile device is brought sufficiently near the card 120 so that NFC data transfer is enabled between the mobile device 140 and the card 120. For communications involving card contact, the contact plates of the EMV chip may be involved in detecting the input. Detecting the input in contactless card communications may involve the communications method defined in ISO 14443. The one or more processors 126 may determine a format (e.g., data format) of the input. For example, the format may be an NDEF data standard, a EuroPay-MasterCard-Visa (EMV) data standard, and/or the like. In some cases, the communication between the card 120a-b and the communicating device may be through application protocol data units (APDUs).

According to some example embodiments consistent with the present disclosure, communication with cards 120a and 120b may involve Application Protocol Data Units (APDUs). When an application is selected, specific APDU messages are exchanged. For example, in EMV, there are various certificate exchanges, and requests for signing transaction data. For RFID type applications, the application is selected, and then File select and then File read commands are sent.

In response to receiving data consistent with an EMV data standard, the one or more processors 126 may activate the first application 132. As a non-limiting example, the one or more processors 126 may include a state machine with various transitions governed by the outcome of authenticity tests at various states. If the received data is consistent with the EMV standard, the data will pass an authentication check for the EMV standard, and the state machine may move to a state where the first application 132 is activated. Activating the first application 132 may include initiating communication directly and/or indirectly between the first application 132 and the point-of-sale device 150. Once activated, the first application 132 may communicate, via NFC, payment data to the point-of-sale device 150. Payment data may include a cardholder's information (e.g., first name, last name, address), card information (e.g., card number, expiration date, security code), and/or details of the transaction (e.g., transaction amount, merchant name). In some embodiments, the first application 132 is configured for communicating payment data specifically to payment terminals or other point-of-sale devices based on the EMV standard. In some embodiments, the first application 132 (or an additional application) may communicate identification data using similar EMV based techniques to non-point-of-sale devices for identification or authentication purposes without initiating a payment transaction, as described for example, in U.S. patent application Ser. No. 16/135,954, filed Sep. 19, 2018 titled "System and Methods for Providing Card Interactions," the contents of which are expressly incorporated by reference herein in its entirety.

In response to receiving data consistent with an NDEF data standard, the one or more processors 126 may activate the second application 134. As a non-limiting example, the one or more processors 126 may include a state machine with various transitions governed by the outcome of authenticity tests at various states. If the received data is consistent with the NDEF standard, the data will pass an authentication check for the NDEF standard, and the state machine may move to a state where the second application 134 is activated. In some embodiments, the received data may include a read request, such as an NFC read, of an NDEF tag, which may be created in accordance with the NDEF data standard. For example, a reader of the mobile device 140 may transmit a message, such as an applet select message, with an applet ID of an NDEF producing applet stored on the card 120. Processors 126 may thus determine that the form of the input is consistent with an NDEF request based on the applet ID or other indicia for example. Data consistent with an NDEF standard may be formatted in a modified form of Type Length Value (TLV) encoding with specific Type bytes encoding various parts of the NDEF message. NFC NDEF information is conveyed in a single NDEF message which can be broken into records. In some embodiments, each record may be further broken into multiple parts. Activating the second application 134 may include initiating communication directly and/or indirectly between the second application 134 and the mobile device 140. Once activated, the second application 134 may communicate, via NFC, identification data to the mobile device 140. Identification data may include any data used to verify or authenticate identity. For example, identification data may include a cryptogram or signature associated with the card 120. Further, identification data may, but need not include any actual identification information of the user. In some embodiments, identification data transmitted via NFC Data Exchange Format One True Pairing (NDEF OTP) may be used to validate an online transaction with an entered card number without requiring a merchant payment system for EMV.

In some embodiments, the card 120b may include a radio frequency identification (RFID) chip 136. The card 120a-b may communicate with the mobile device 140 when the card 120a-b is within an NFC range of a digital reader of the mobile device 140. More specifically, the second application 134 may communicate directly and/or indirectly with the mobile device 140. In some embodiments, communication may involve transmitting a public key of a key pair of the card 120b to the mobile device 140. The card 120b may receive from the mobile device 140 one or more instructions to generate a digital signature. Using a private key of the key pair of the card 120b, the second application 134 may generate the digital signature. The card 120b may transmit the digital signature to the mobile device 140, based on which card 120b (and/or its user) may be authenticated. In some embodiments, the card 120b may receive a request from the mobile device 140 (e.g. from an application on the mobile device configured to transmit the request) comprising an instruction to generate a cryptogram, from which the card 120b may be authenticated. For example, the cryptogram may be a message authentication code (MAC) cryptogram as described in U.S. patent application Ser. No. 16/205,119, filed on Nov. 29, 2018, titled "Systems and Methods for Cryptographic Authentication of Contactless Cards," the contents of which are expressly incorporated by reference herein in its entirety.

The cards 120a-b may be configured to send only one of the payment data and the identification data to a single communicating device (e.g., mobile device 140, point-of-sale device 150). For example, cards 120a-b may isolate the payment data and the identification data from different applications (e.g., first and second applications 132 and 134). Accordingly, when the first application 132 is activated, a first set of data is available for transmission and when the second application 134 is activated, a second set of data is available for transmission. Further, the first application 132 may be unable to access the identification data and the second application may be unable to access the payment data. According to some embodiments, the cards 120a-b may transmit only payment data or only identification data based on a request from point-of-sale device 150 or mobile device 140, respectively.

Turning to the mobile device 140, in some embodiments, the mobile device 140 may include a digital card reader and/or one or more applications. The mobile device 140 may be configured to transmit an input to the card 120a-b. The input may provide data indicative of a particular data exchange format. For example, the data may be consistent with data transmitted in an EMV data standard, an NDEF data standard, and/or other comparable data exchange standards. For example, the mobile device 140 may communicate, via NFC, and based on the NDEF data standard with the second application 134. The mobile device 140 may receive identification data from the card 120a-b. The mobile device 140 may receive a public key of a key pair of the card 120b. In response, the mobile device 140 may transmit one or more instructions to generate a digital signature to the card 120b. The mobile device 140 may receive the generated digital signature from the card 120b.

The point-of-sale device 150 may include one or more of a monitor, one or more processors, and a digital reader capable of performing NFC. The point-of-sale device 150 may communicate, via NFC and based on the EMV data standard, with the first application 132. The point-of-sale device 150 may receive payment data from the card 120a-b.

Figure 2:
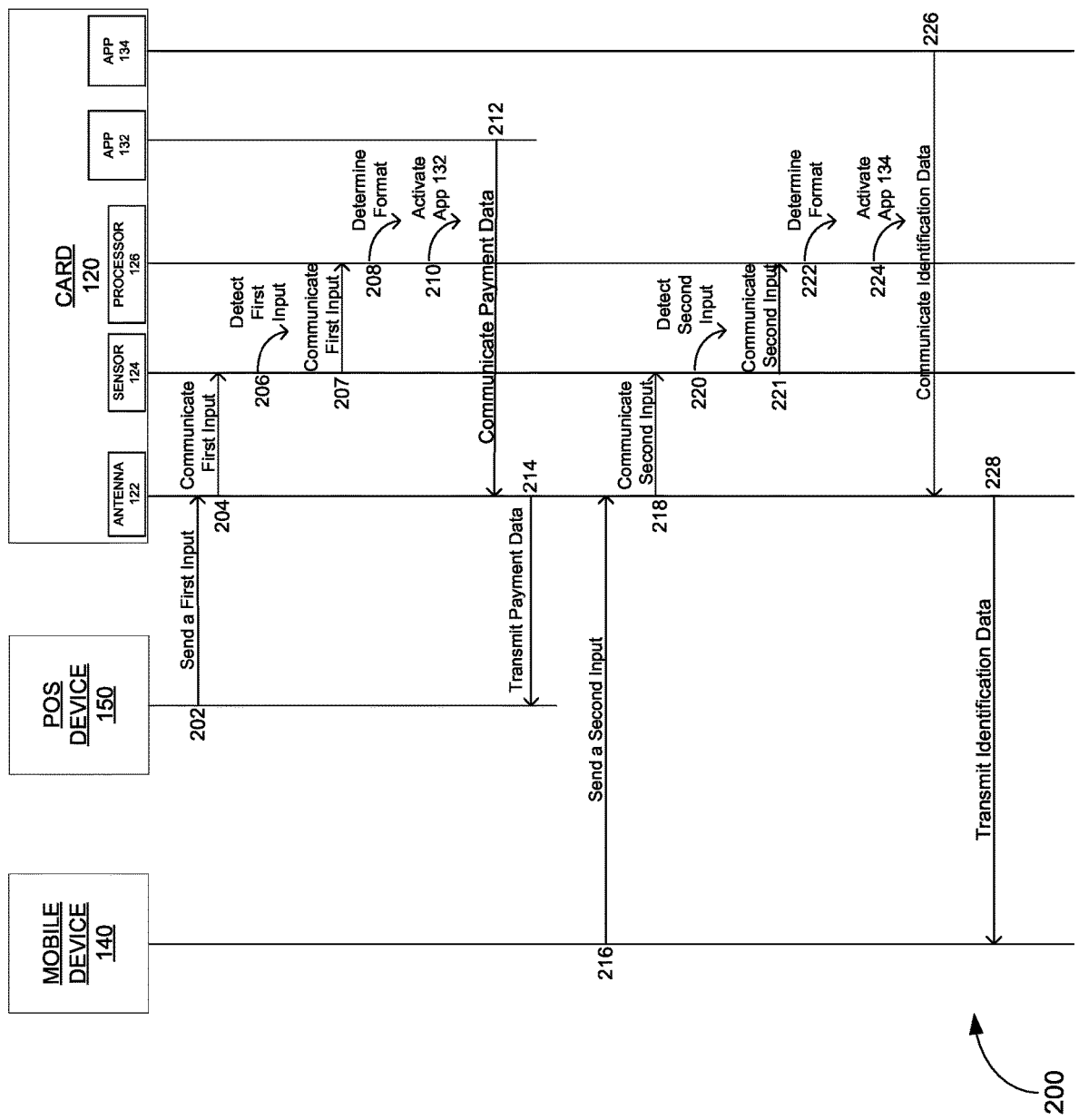
FIG. 2 is a timing diagram providing selective communications with a plurality of device types according to an example embodiment.

FIG. 2 is a timing diagram of providing selective communications with a plurality of device types. According to some embodiments, at 202, the point-of-sale device 150 may send a first input (e.g. communication, request, etc.) to the card 120a. The antenna 122 may receive the first input. The input may be indicative of a data format (e.g., EMV data standard). At 204, the antenna 122 may communicate the first input to the sensor 124. The sensor 124 may detect the first input at 206 (e.g., by differentiating the input from noise), and communicate the existence of the first input with the processor 126 at 207. At 208, the processor(s) 126 may determine the format of the input. In some embodiments, a program (e.g., an applet) associated with the processor(s) 126 can determine the format of the input based on an identification activation sequence. Such the identification activation sequence may be used to select a specific application for activation. In response to determining that the format of the received data is consistent with an EMV data standard, at 210, the processor 126 activates the first application 132. Activating the first application 132 may involve establishing communication between the processor 126 and the first application 132. Further, the processor(s) 126 may communicate the input and/or the data format to the first application 132. At 212, the first application 132 may communicate the payment data, for output, to the antenna 122. In some embodiments, prior to transmitting payment data to the point-of-sale device 150, the card 120 verifies the point-of-sale device 150 by exchanging digital signatures and establishing trust with the point-of-sale device 150 via Certificate Authority (CA) chains. At 214, the antenna 122 transmits the payment data the point-of-sale device 150. In some embodiments, as discussed above, a first application 132 may also be configured to communicate for non-payment purposes, such as for authentication or identification, to a non-point-of-sale device, such as mobile device 140, using the EMV data standard.

At 216, the mobile device 140 may send a second input to the card 120a. The antenna 122 receives the second input. The input may be indicative of a data format (e.g., an NDEF data standard). At 218, the antenna 122 may communicate the second input to the sensor 124. The sensor 124 detects the second input at 220 (e.g., by differentiating the input from noise), and communicates the existence of the second input with the processor 126 at 221. Detecting the input may involve deciphering the input from the mobile device 140 such that the data format is at least recognized by the card 120a. At 222, the processor(s) 126 may determine the format of the input. At 224, in response to determining that the format is consistent with a contactless NDEF data standard, the processor 126 activates the second application 134. Activating the second application 134 may involve establishing communication between the processor(s) 126 and the second application 134. Further, the processor(s) 126 may communicate the input and/or the data format to the second application 134. At 226, the second application 134 may communicate the identification data, for output, to the antenna 122. At 228, the antenna 122 transmits the identification data the mobile device 140.

In an example scenario, a customer or user is seeking to pay a merchant who is using a smartphone (e.g., mobile device 140) equipped with a digital reader. The customer taps his credit card (e.g., 120a-b) against the merchant's smartphone such that NFC communication is established. The smartphone may be equipped with a payment application requiring both identification data and payment data in order to process a transaction. The credit card receives an input from the smartphone. The input includes data consistent with an NDEF data standard. Responsive to determining data consistent with the NDEF data standard, the credit card transmits identification data to the smartphone. The smartphone verifies the cardholder's identity and then sends a second input consistent with an EMV data standard. After determining the EMV data standard, the credit card transmits payment data to the smartphone. The smartphone verifies the payment information and completes the transaction.

Figure 3:
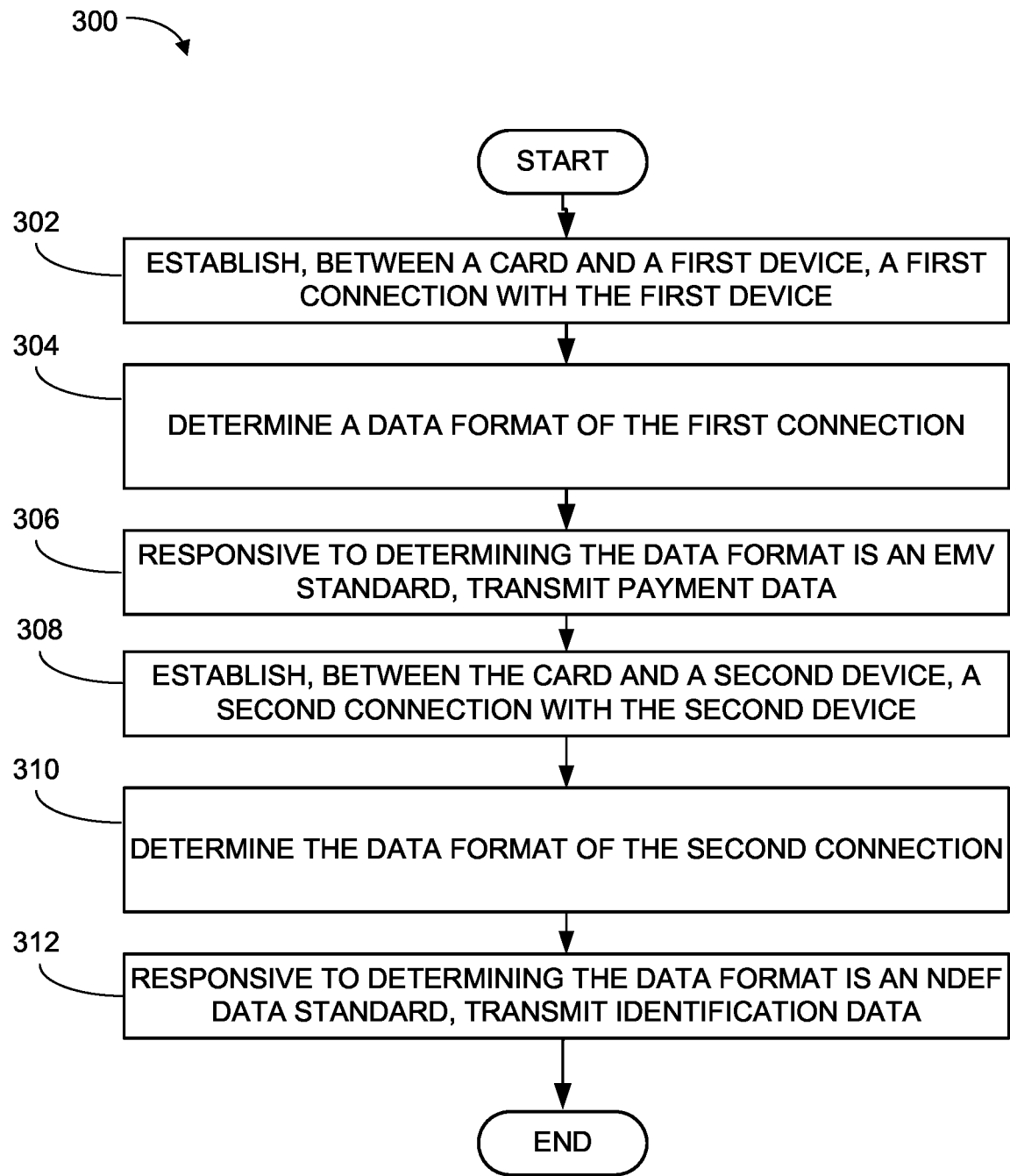
FIG. 3 is a flow chart of a method providing selective communications with a plurality of device types according to an example embodiment.

FIG. 3 is a flow chart of a method providing selective communications with a plurality of device types. At 302, a first connection between the card 120a-b and the first device (e.g., point-of-sale device 150) is established. Establishing a first connection between the card 120a-b and the point-of-sale device 150 may involve bringing the card 120a-b within an NFC range of a digital reader of the point-of-sale device 150. Establishing a first connection may further involve receipt of an input by the card 120a-b from the point-of-sale device 150. At 304, the data format of the first connection may be determined by the processor 126. The data format of the first connection may be consistent with an EMV data standard, an NDEF data standard, or another data standard capable of transmitting data via an NFC. For example, the processor 126 determines the data format of the first connection is consistent with an EMV data standard. At 306, in response to determining the data format is consistent with an EMV data standard, the card 120a-b transmits the payment data to the point-of-sale device 150. In some embodiments, the first application 132 may output, for transmission, the payment data to the point-of-sale device 150.

At 308, a second connection between the card 120a-b and the second device (e.g., mobile device 140) is established. Establishing a second connection between the card 120a-b and the mobile device 140 may involve bringing the card 120*a-b* within an NFC range of a digital reader of the mobile device 140. Establishing a second connection may further involve receipt of an input by the card 120*a-b* from the mobile device 140. At 310, the data format of the second connection may be determined by the processor 126. The data format of the second connection may be consistent with an EMV data standard, an NDEF data standard, or another data standard capable of transmitting data via an NFC. Here, the processor 126 determines the data format of the second connection is consistent with an NDEF data standard. At 312, in response to determining the data format is consistent with an NDEF data standard, the card 120*a-b* transmits the identification data to the mobile device 140. In some embodiments, the second application 134 may output, for transmission, the identification data to the mobile device 140.

Figure 4:
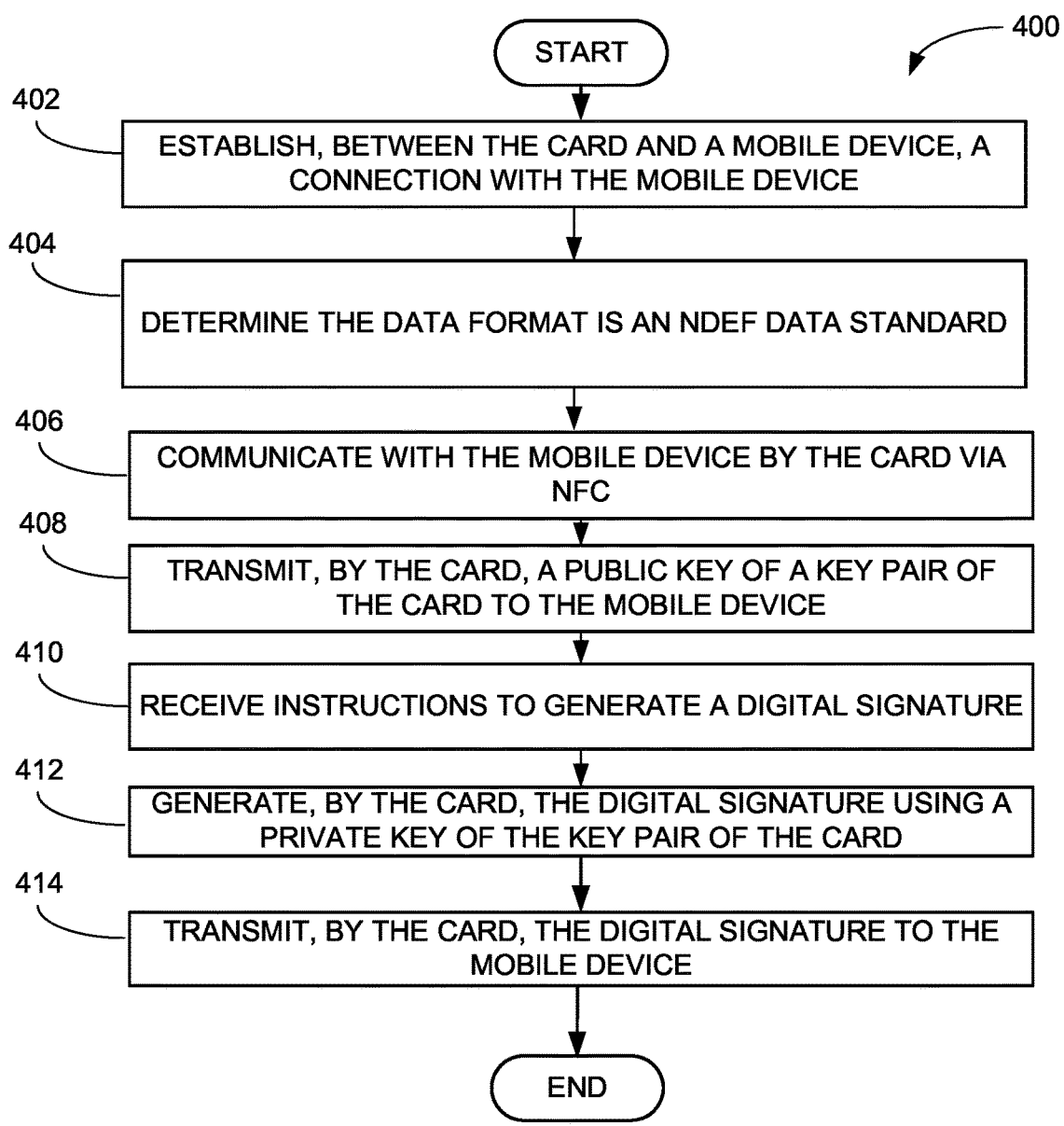
FIG. 4 is a flow chart of a method providing selective communications with a certain device type according to an example embodiment.

FIG. 4 is a flow chart of a method providing selective communications with a certain device type. The method described herein involves a card 120*a-b* and a mobile device 140 and further details certain steps in authenticating identification information. At 402, a connection between the card 120*a-b* and the mobile device 140 is established. The connection may be established when the card 120*a-b* is placed within an NFC range of a digital reader associated with the mobile device 140. At 404, the processor 126 may determine the data format of the connection is consistent with an NDEF data standard. At 406, the card 120*a-b* may further communicate with the mobile device 140 via NFC. The communication may be used to authenticate the identification data of the card 120*a-b*. At 408, the card 120*a-b* transmits a public key of a key pair of the card 120*a-b* to the mobile device 140. At 410, the card 120*a-b* receives instructions to generate a digital signature from the mobile device 140. Based on the received instructions from the mobile device 140, the card 120*a-b* generates a digital signature using a private key of the key pair of the card 120*a-b*, at 412. In some cases, the identification information may be incorporated within the digital signature or otherwise conveyed with the digital signature. At 414, the card 120*a-b* transmits the digital signature to the mobile device 140. In some embodiments, the digital signature may be any form of cryptogram based on a secret known by the card 120*a-b* and/or generated by the card 120*a-b*, not necessarily a private key of a key pair. For example, any cryptographic technique for reliably verifying the authenticity of card 120*a-b* may be used.

Figure 5:
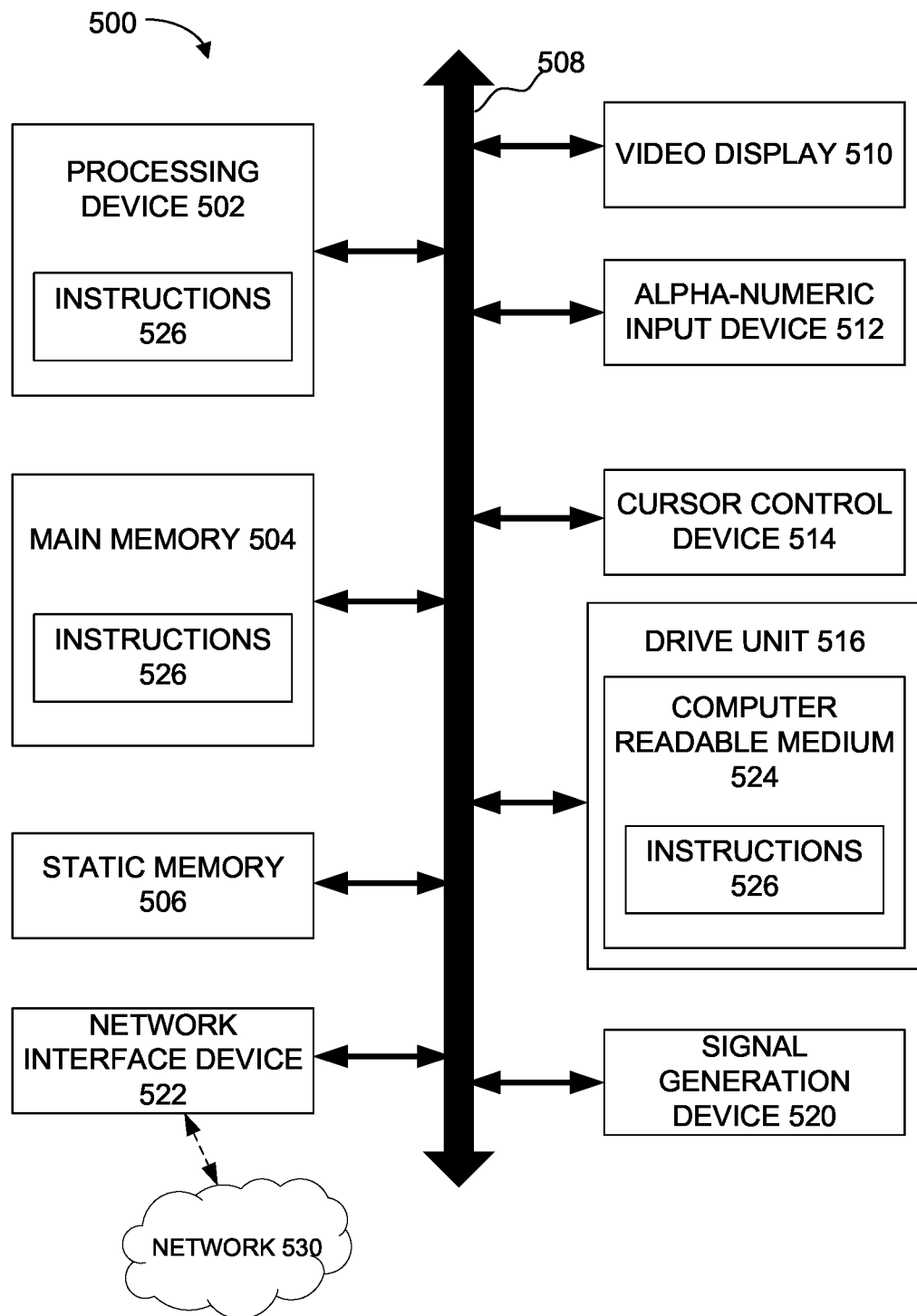
FIG. 5 is a block diagram of an example computer system that may implement certain aspects of the present disclosure.

FIG. 5 is a block diagram of an example computer system 500 that may implement certain aspects of the present disclosure. The computer system 500 may include a set of instructions 526 for controlling operation of the computer system 500. In some implementations, the computer system 500 may be connected (e.g., networked) to other machines in a Local Area Network (LAN), an intranet, an extranet, a satellite communications system, or the Internet. The computer system 500 may operate in the capacity of a server or a client machine in a client-server network environment, or as a peer machine in a peer-to-peer (or distributed) network environment. The computer system 500 may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single computer system 500 is illustrated, the term "machine" shall also be taken to include any collection of machines (e.g., computers) that individually or jointly execute a set (or multiple sets) of instructions to perform any one or more of the methodologies discussed herein.

The computer system 500 includes a processing device 502, a main memory 504 (e.g., read-only memory (ROM), flash memory, dynamic random-access memory (DRAM) such as synchronous DRAM (SDRAM), etc.), a static memory 506 (e.g., flash memory, static random-access memory (SRAM), etc.), and a secondary memory 516 (e.g., a data storage device), which communicate with each other via a bus 508.

The processing device 502 represents one or more general-purpose processing devices such as a microprocessor, a microcontroller, a central processing unit, or the like. As non-limiting examples, the processing device 502 may be a reduced instruction set computing (RISC) microcontroller, a complex instruction set computing (CISC) microprocessor, a RISC microprocessor, very long instruction word (VLIW) microprocessor, a processor implementing other instruction sets, or one or more processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute the operations for electronically creating and trading derivative products based on one or more indices relating to volatility.

The computer system 500 may further include a network interface device 522, which is connectable to a network 530. The computer system 500 also may include a video display unit 510, i.e., a display (e.g., a liquid crystal display (LCD), a touch screen, or a cathode ray tube (CRT)), an alphanumeric input device 512 (e.g., a keyboard), a cursor control device 514 (e.g., a mouse), and a signal generation device 520 (e.g., a speaker).

The secondary memory 516 may include a non-transitory storage medium 524 on which is stored one or more sets of instructions 526 for the computer system 500 representing any one or more of the methodologies or functions described herein. For example, the instructions 526 may include instructions for implementing an asset tracking device including a power source and power management system or subsystem for a container or a trailer. The instructions 526 for the computer system 500 may also reside, completely or at least partially, within the main memory 504 and/or within the processing device 502 during execution thereof by the computer system 500, the main memory 504 and the processing device 502 also constituting computer-readable storage media.

While the storage medium 524 is shown in an example to be a single medium, the term "storage medium" should be taken to include a single medium or multiple media that store the one or more sets of instructions for a processing device. The term "storage medium" shall also be taken to include any medium that is capable of storing or encoding a set of instructions for execution by the machine that cause the machine to perform any one or more of the methodologies of the disclosure. The term "storage medium" shall accordingly be taken to include, but not be limited to, solid-state memories, and optical and magnetic media.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Exemplary Use Cases

The following example use cases describe examples of particular implementations of a cardholder using a contactless card for selective communication. These examples are intended solely for explanatory purposes and not limitation. In one case, a cardholder seeks to pay a merchant for items purchased at the merchant's store. When the merchant rings up the item on the register (e.g., point-of-sale device 150), a total is presented to the cardholder. The cardholder takes his credit card (e.g., card 120a-b) out his wallet and taps it against the digital card reader associated with the register. Once the card taps the digital reader, communication between the digital card reader and the card is initiated. The card recognizes the data sent from the digital card reader as being consistent with an EMV data standard. In response, an application on the card solely responsible for communicating data associated with the EMV data standard transmits only payment data (e.g. data required for facilitating payment) to the digital reader associated with the register. The register receives the payment data and processes the payment. Because the credit card only transmitted payment data, the cardholder is afforded a more secure transaction as data unrelated to the transaction is not transmitted.

In another case, a cardholder seeks to login to a banking app associated with his debit card. The banking app may require multi-level authentication, i.e., first level authentication requires a username/password combination or some form of biometric data (e.g., optical data, face recognition, thumbprint data) and second level authentication requires identity data associated with the card (e.g., first and last name, social security information) to match at least some of the first level authentication data. The cardholder taps his debit card against a digital reader associated with his smartphone (e.g., mobile device 140). Once the debit card taps the digital reader, communication between the digital card reader and the debit card is initiated. The debit card recognizes the data sent from the digital card reader as being consistent with an NDEF data standard. In response, an application on the debit card solely responsible for communicating data associated with the NDEF data standard transmits only identification data (e.g., data required for facilitating identification/authentication purposes) to the digital reader associated with the smartphone. The smartphone, via an application, receives the identification data and authenticates the cardholder's identity (e.g., compares the identification data to first level authentication data). Because the debit card only transmitted identification data, the cardholder is afforded a more secure transaction as data unrelated to authentication is not transmitted.

We claim:
1. A card comprising:
one or more antennas;
one or more processors;
non-transitory memory in communication with the one or more processors and storing instructions that, when executed, cause the one or more processors to perform the steps of:
  receiving, via at least one of the one or more antennas, first data of a first data type from a first device, the first data type corresponding to authentication data and having a non-Europay-Mastercard-Visa (EMV) format;
  generating, via a first application configured to process data of the first data type, a first response to the first data, the first response used for authentication at the first device;
  transmitting, via at least one of the one or more antennas, the first response to the first device;
  receiving, via at least one of the one or more antennas, second data of a second data type from a second device, the second data type corresponding to transaction data;
  generating, via a second application configured to process data of the second data type, a second response to the second data, the second response comprising payment data for a transaction; and
  transmitting, via at least one of the one or more antennas, the second response to the second device.

2. The card of claim 1, wherein:
the card is a contactless payment card,
the first device is a mobile device, and
the second device is a point-of-sale (POS) device.

3. The card of claim 2, wherein:
the first data type is identified using a first identifier associated with the first application, and
the second data type is identified using a second identifier associated with the second application.

4. The card of claim 2, wherein:
the first response is used to activate the card for use with commercial EMV transactions, and
the second response is used to complete the transaction at a point-of-sale (POS) device.

5. The card of claim 4, wherein:
the second data is in a EMV format, and
the memory stores further instructions that are configured to cause the one or more processors to perform the steps of:
establishing a first communication pathway between the card and the first device requiring the card to be within a first communication range of the first device, and
establishing a second communication pathway between the card and the second device requiring the card to be within a second communication range of the second device.

6. The card of claim 5, wherein:
the first data and the second data are received via at least one of the one or more antennas via near field communication (NFC), and
the card is within the first communication range at least when the card is tapped on the first device.

7. The card of claim 6, wherein:
at least one of the first data and the second data are encrypted,
at least one of the first response and the second response are encrypted,
the first application is unable to access the second data, and
the second application is unable to access the first data.

8. The card of claim 7, wherein:
the memory stores further instructions that are configured to cause the card to transmit, via at least one of the one or more antennas, a public key of a key pair stored the memory to the first device; and
the first data comprises instructions to generate a digital signature, the instructions corresponding to the public key.

9. The card of claim 8, wherein:
generating the first response comprises generating the digital signature using a private key of the key pair stored in the memory, and
the first response comprises the digital signature.

10. The card of claim 9, wherein:
generating the digital signature using the private key comprises generating a first key based on the private key using a counter.

11. A transaction card comprising:
one or more antennas;
one or more processors;
non-transitory memory in communication with the one or more processors and storing a first applet configured to exclusively process a first data type for transactions, a second applet configured to process a second data type for authentication, and instructions that, when executed, cause the one or more processors to perform the steps of:
receiving, via at least one of the one or more antennas, first data of the first data type from a first device;
generating, via the first applet, a first response to the first data;
transmitting, via at least one of the one or more antennas, the first response to the first device;
receiving, via at least one of the one or more antennas, second data of a second data type;
generating, via the second applet, a second response to the second data, wherein the first applet is unable to access the second data and the second applet is unable to access the first data; and
transmitting, via at least one of the one or more antennas, the second response.

12. The transaction card of claim 11, wherein:
the transaction card is a contactless payment card,
the first device is a mobile device,
the first data is transaction data, and
the second data is a request for authentication data.

13. The transaction card of claim 12, wherein:
the first response comprises payment data, and
the second response is used to authenticate an identity of a user.

14. The transaction card of claim 13, wherein:
the user is a payor of a transaction,
the payment data is used to complete the transaction,
at least one of the first data and the second data are encrypted, and
at least one of the first response and the second response are encrypted.

15. The transaction card of claim 12, wherein:
the transaction data is in a EuroPay-Mastercard-Visa (EMV) format, and
the first response is in an EMV format.

16. The transaction card of claim 12, wherein:
the request for authentication data is received via near field communication (NFC),
the second response is transmitted via NFC, and
the memory stores further instructions that are configured to cause the one or more processors to perform the steps of:
determining the first data is the first data type based on a first identifier associated with the first applet; and
determining the second data is the second data type based on a second identifier associated with the second applet.

17. The transaction card of claim 16, wherein:
the request for authentication data is in a non-EMV format, and
the first response is in a non-EMV format.

18. The transaction card of claim 12, wherein:
the memory stores further instructions that are configured to cause the one or more processors to perform the steps of:
receiving, during personalization of the transaction card, one or more preloaded credentials, and
at least one of the one or more preloaded credentials are used to generate the second response.

19. The transaction card of claim 11, wherein:
the memory stores further instructions that are configured to cause the one or more processors to perform the steps of:
transmitting, via at least one of the one or more antennas, a public key of a key pair stored the memory to the first device; and the first data comprises instructions to generate a digital signature, the instructions corresponding to the public key.

20. The transaction card of claim 19, wherein:
generating the first response comprises generating the digital signature using a private key of the key pair stored in the memory, and
the first response comprises the digital signature.

21. The transaction card of claim 20, wherein the memory stores further instructions that are configured to cause the one or more processors to perform the steps of:
receiving, during personalization, one or more preloaded credentials, the one or more preloaded credentials comprising at least the private key of the key pair.

22. The transaction card of claim 21, wherein:
generating the digital signature using the private key comprises:
generating a first key based on the private key using a counter.

23. The transaction card of claim 11, wherein:
the second response is used to launch an application on the first device, activate an application on the first device, download an application on the first device, or combinations thereof.

24. A method comprising:
receiving, via at least one or more antennas of a card, first data of a first data type from a first device, the first data type corresponding to authentication data and having a non-Europay-Mastercard-Visa (EMV) format;
generating, via a first application of the card configured to process data of the first data type, a first response to the first data, the first response used for authentication at the first device;
transmitting, via at least one of the one or more antennas, the first response to the first device;
receiving, via at least one of the one or more antennas, second data of a second data type from a second device, the second data type corresponding to transaction data;
generating, via a second application of the card configured to process data of the second data type, a second response to the second data, the second response comprising payment data for a transaction; and
transmitting, via at least one of the one or more antennas, the second response to the second device.

25. The method of claim 24, wherein:
the card is a contactless payment card,
the first device is a mobile device,
the second device is a point-of-sale (POS) device,
the first response is used to activate the card for use with commercial EMV transactions, and
the second response is used to complete the transaction at a point-of-sale (POS) device.

26. The method of claim 24, further comprising:
identifying the first data type using a first identifier associated with the first application, and
identifying the second data type using a second identifier associated with the second application.

27. The method of claim 24, further comprising:
establishing a first communication pathway between the card and the first device requiring the card to be within a first communication range of the first device,
establishing a second communication pathway between the card and the second device requiring the card to be within a second communication range of the second device, and
wherein:
the second data is in a EMV format,
the first data and the second data are received via at least one of the one or more antennas via near field communication (NFC),
the card is within the first communication range at least when the card is tapped on the first device,
at least one of the first data and the second data are encrypted,
at least one of the first response and the second response are encrypted,
the first application is unable to access the second data, and
the second application is unable to access the first data.

28. The method of claim 24, further comprising:
transmitting, via at least one of the one or more antennas, a public key of a key pair stored in a memory of the card to the first device, and
the first data comprises instructions to generate a digital signature, the instructions corresponding to the public key.

29. The method of claim 28, wherein:
generating the first response comprises generating the digital signature using a private key of the key pair stored in the memory, and
the first response comprises the digital signature.

30. The method of claim 29, wherein:
generating the digital signature using the private key comprises generating a first key based on the private key using a counter.

* * * * *